(12) United States Patent
Fukushige et al.

(10) Patent No.: US 9,647,583 B2
(45) Date of Patent: May 9, 2017

(54) VARIABLE MAGNETIZATION MACHINE CONTROLLER

(71) Applicants: Nissan Motor Co., Ltd., Yokohama-shi, Kanagawa (JP); Wisconsin Alumni Research Foundation, Madison, WI (US)

(72) Inventors: Takashi Fukushige, Kanagawa (JP); Chen-yen Yu, Cupertino, CA (US); Robert D. Lorenz, Madison, WI (US)

(73) Assignees: Nissan Motor Co., Ltd., Yokohama (JP); Wisconsin Alumni Research Foundation, Madison, WI (US)

( * ) Notice: Subject to any disclaimer, the term of this patent is extended or adjusted under 35 U.S.C. 154(b) by 13 days.

(21) Appl. No.: 14/900,205

(22) PCT Filed: Jun. 28, 2013

(86) PCT No.: PCT/US2013/048562
§ 371 (c)(1),
(2) Date: Dec. 21, 2015

(87) PCT Pub. No.: WO2014/209360
PCT Pub. Date: Dec. 31, 2014

(65) Prior Publication Data
US 2016/0149524 A1 May 26, 2016

(51) Int. Cl.
*H02P 21/00* (2016.01)
*H02P 6/08* (2016.01)
*H02P 21/28* (2016.01)

(52) U.S. Cl.
CPC ............ *H02P 6/08* (2013.01); *H02P 21/0089* (2013.01); *H02P 21/28* (2016.02)

(58) Field of Classification Search
CPC ...... H02P 1/00; H02P 3/00; H02P 5/00; H02P 21/00; H02P 23/00; H02P 25/00;
(Continued)

(56) References Cited

U.S. PATENT DOCUMENTS 8,710,775 B2 * 4/2014 Sagami ............... B62D 5/0487
318/400.02
2012/0176069 A1 7/2012 Sagami et al.

FOREIGN PATENT DOCUMENTS

JP 2009-153296 A 7/2009

OTHER PUBLICATIONS

Wei Xu et al., "Reduced Parameter Sensitivity Stator Flux Linkage Observer in Deadbeat-Direct Torque and Flux Control for IPMSMs," 2013 IEEE International Electric Machines & Drives Conference, May 2013, pp. 513-520, Chicago, IL.

* cited by examiner

*Primary Examiner* — Antony M Paul
(74) *Attorney, Agent, or Firm* — Global IP Counselors, LLP

(57) ABSTRACT

A variable magnetization machine controller has a current command module, a magnetization module and a reducing current module. The current command module computes a vector current command in a dq axis based on a torque command. The magnetization module applies a magnetization control pulse to a d-axis current of the vector current command. Thus, the reducing current module applies a reducing current to a q-axis current of the vector current command based on the torque command and one of an estimated torque of the variable magnetization machine and a measured torque of the variable magnetization machine.

16 Claims, 19 Drawing Sheets

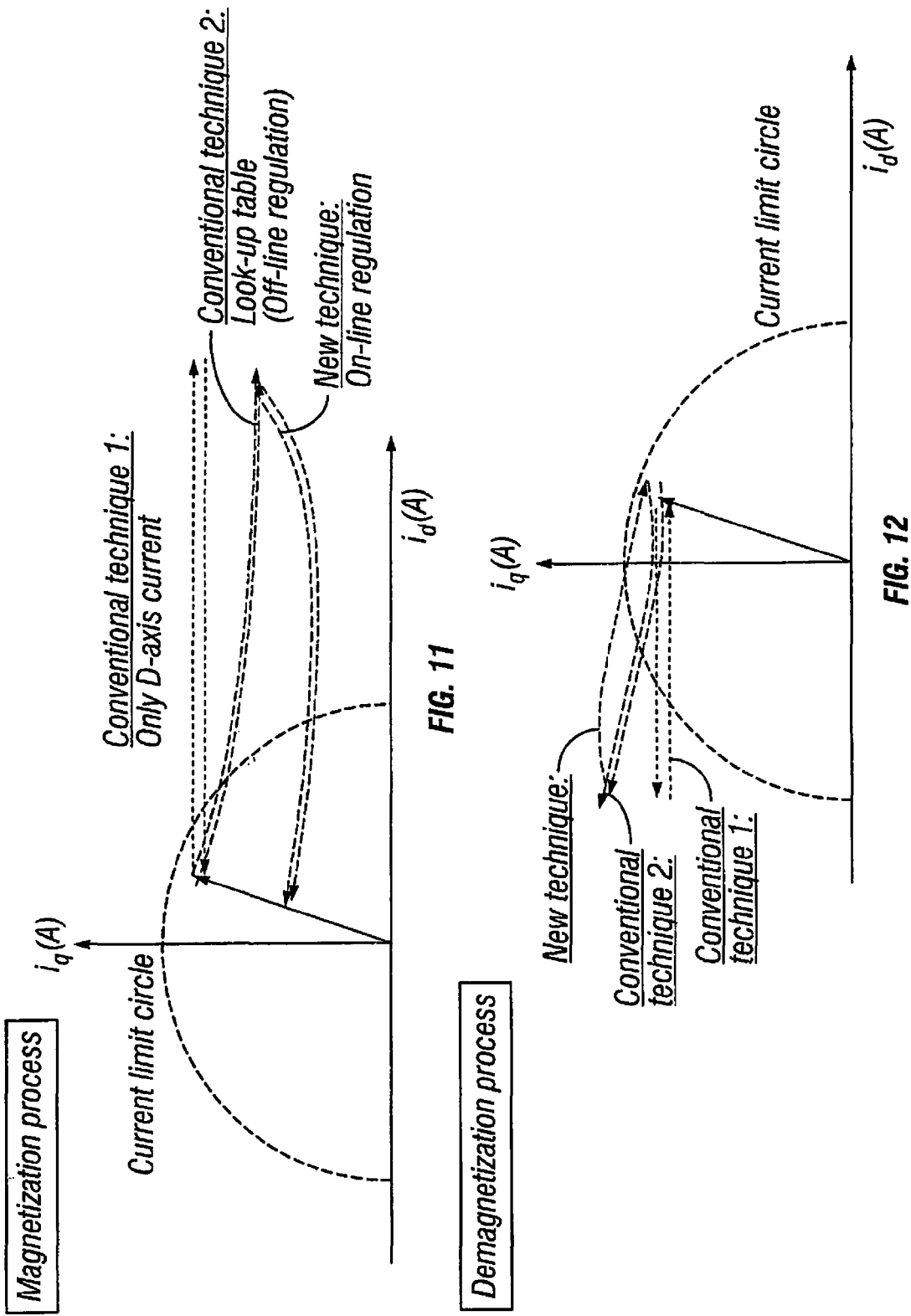

VARIABLE MAGNETIZATION MACHINE CONTROLLER

CROSS-REFERENCE TO RELATED APPLICATIONS

This application is a U.S. National stage application of International Application No. PCT/US2013/048562, filed Jun. 28, 2013, the contents of which is hereby incorporated herein by reference.

BACKGROUND

Field of the Invention

The present invention generally relates to a variable magnetization machine controller. More particularly, the present invention relates to a controller for changing the magnetization level of a variable magnetization machine, such as an electric motor employed in an electric or hybrid electric vehicle.

Background Information

Electric vehicles and hybrid electric vehicles (HEV) include an electric motor that operates as a drive source for the vehicle. In a purely electric vehicle, the electric motor operates as the sole drive source. On the other hand, an HEV includes an electric motor and a conventional combustion engine that operate as the drive sources for the vehicle based on conditions as understood in the art.

Electric vehicles and HEVs can employ an electric motor having variable magnetization characteristics as understood in the art. For example, the magnetization level of the motor can be increased to increase the torque generated by the motor. Accordingly, when the driver attempts to accelerate the vehicle to, for example, pass another vehicle, the motor controller can change the magnetization level to increase the torque output of the motor and thus increase the vehicle speed.

Certain techniques exist for increasing the magnetization level of such an electric motor. In one technique (conventional technique 1), only the d-axis current of the motor is increased. This results in the electric motor outputting a pulsating torque that pulsates due to the pulsating d-axis current and also due to changes in the magnetization level. In another technique (conventional technique 2), such as that described in JP 2009-153296, a controller can set the magnetization level of the motor based on values retrieved from a look-up table. In doing so, the controller can regulate the d-axis current and also the q-axis current. However, as understood in the art, because the q-axis current is determined using open loop (feed forward) control, a 2-dimensional look-up table is necessary to maintain a constant torque output by the motor. As further understood in the art, creating such a look-up table is very complicated and time consuming. Also, since open loop control is used, the same look-up table may not necessarily be useful with different motors due to the different characteristics of the individual motors, even if those motors are manufactured in mass production.

SUMMARY

Accordingly, it is desirable to provide an improved controller for a variable magnetization machine, such as a variable magnetization motor for a vehicle.

In view of the state of the known technology, one aspect of a variable magnetization machine controller according to the disclosed embodiments comprises a current command module, a magnetization module and a reducing current module. The current command module computes a vector current command in a dq axis based on a torque command. The magnetization module applies a magnetization control pulse to a d-axis current of the vector current command. Thus, the reducing current module applies a reducing current to a q-axis current of the vector current command based on the torque command and one of an estimated torque of the variable magnetization machine and a measured torque of the variable magnetization machine.

BRIEF DESCRIPTION OF THE DRAWINGS

Referring now to the attached drawings which form a part of this original disclosure:

FIG. 11 is a graph illustrating an example of the behavior of the d-axis current signal during a magnetization process of the variable magnetization machine as performed by the variable magnetization machine controller as compared to conventional magnetization processes;

FIG. 12 is a graph illustrating an example of the behavior of the d-axis current signal during a demagnetization process of the variable magnetization machine as performed by the variable magnetization machine controller as compared to conventional demagnetization processes;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
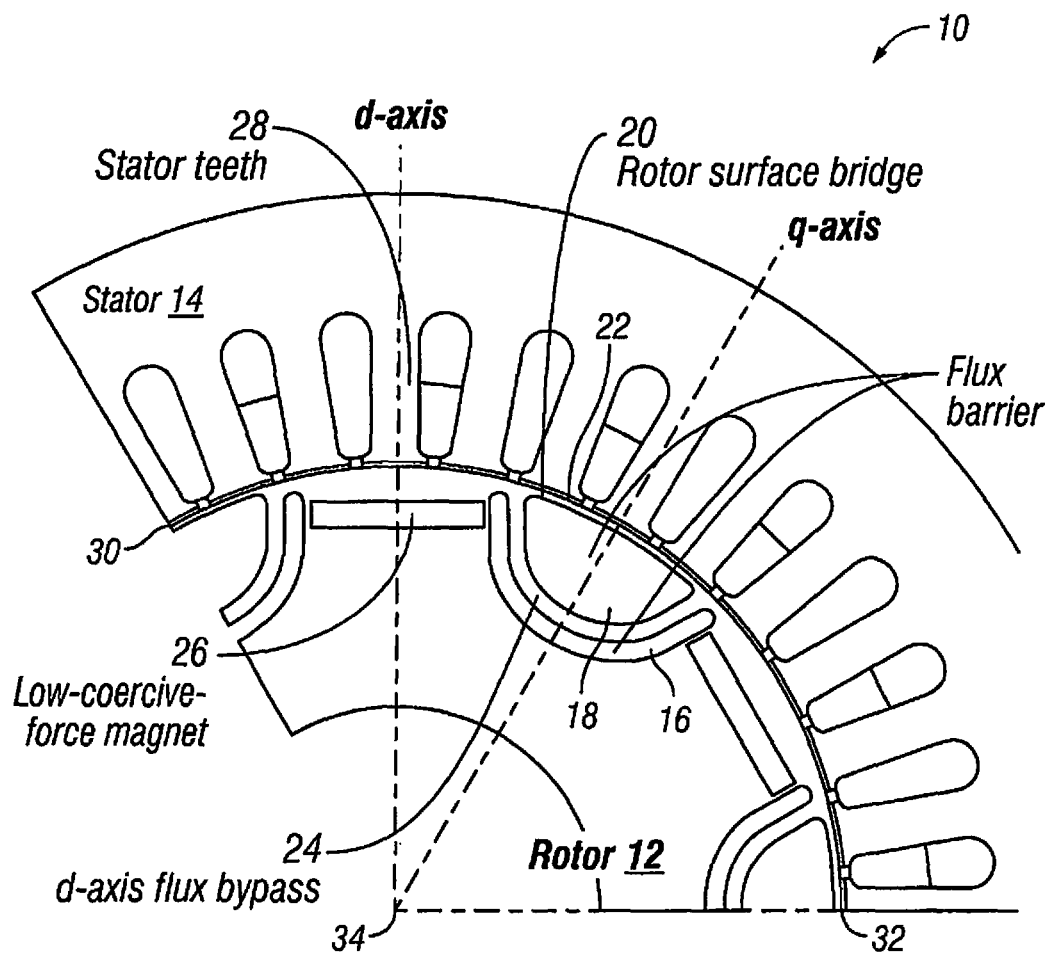
FIG. 1 is a partial cross-sectional schematic view of a variable magnetization machine according to a disclosed embodiment.

As shown in FIG. 1, a variable magnetization machine 10, which can also be referred to as a variable magnetization motor, includes a rotor 12 and a stator 14. The variable magnetization machine 10 can be employed in any type of electric vehicle or HEV such as an automobile, truck, SUV and so on, and in any other type of apparatus as understood in the art. The rotor 12 and the stator 14 can be made of metal or any other suitable material as understood in the art.

In this example, the rotor 12 is configured to include a plurality of pairs of flux barriers 16 and 18, which can be configured as air gaps or can include any suitable type of insulating material as is conventional in the art. Although only one full pair and two partial pairs of the flux barriers 16 and 18 are shown, in this example, six pairs of flux barriers 16 and 18 can be spaced at 60 degree angles about the outer perimeter of the rotor 12. Naturally, the rotor 12 can include as many pairs of flux barriers 16 and 18 as deemed appropriate for the environment in which the variable magnetization machine 10 is employed. Also, as shown in this example, a q-axis of the motor passes through the center of a pair of flux barriers 16 and 18. However, the pairs of flux barriers 16 and 18 can be positioned at any suitable location with respect to the q-axis to achieve the operability of the embodiments discussed herein.

As further shown, a surface bridge 20 of the rotor 12 is present between the radially outward boundary of each flux barrier 18 and the outer circumference 22 of the rotor 12. Furthermore, a d-axis flux bypass 24 is present between each of the adjacent pairs of flux barriers 16 and 18. In this example, the surface bridges 20 and the d-axis flux bypasses 24 are made of the same material as the rotor 12. However, the surface bridges 20 and the d-axis flux bypasses 24 can be made of any suitable type of material as known in the art.

In addition, a plurality of low-coercive-force magnets 26 are spaced between adjacent pairs of flux barriers 16 and 18 about the circumference of the rotor 12. As indicated, each of these magnets 26 extends longitudinally in a perpendicular or substantially perpendicular direction with respect to portions of adjacent flux barriers 16. However, the magnets 26 can be configured in any suitable size and shape. Also, in this example, the rotor 12 includes 6 magnets 26 which are positioned between the 6 pairs of flux barriers 16 and 18 and spaced at 60 degree intervals in a circumferential direction about the rotor 12. However, the number of magnets 26 can change with respect to a change in the number of pairs of flux barriers 16 and 18. Furthermore, each magnet 26 can be configured as a plurality of magnets. In this example, a d-axis passes through a center of a magnet 26. However, the magnets 26 can be positioned at any suitable location with respect to the d-axis to achieve the operability of the embodiments discussed herein.

The stator 14 includes a plurality of stator teeth 28 and other components such as windings (not shown) which can be configured in any conventional manner. In this example, the stator teeth 28 are configured as wide stator teeth as known in the art. However, the stator teeth 28 can have any suitable size, and the stator 14 can include any number of stator teeth 28 to achieve the operability of the embodiments discussed herein. In this example, the stator teeth 28 are open to the inner circumference 30 of the stator 14, but can be closed if desired. Also, an air gap 32 is present between the outer circumference 22 of the rotor 12 and the inner circumference 30 of the stator to enable the rotor 12 to rotate unrestrictedly or substantially unrestrictedly about an axis 34.

A variable magnetization machine controller 100 according to a disclosed embodiment will now be described with reference to FIGS. 2 through 4. As will be appreciated from the description of this embodiment and the other embodiments set forth herein, the q-axis current is reduced online using feedback, and by adding a regulated amount to the q-axis current, the torque of the variable magnetization machine 10 can be maintained constant or substantially constant.

As shown, the variable magnetization machine controller 100 includes an ordinary control module 102, a magnetization current pulse control module 104, a reducing current control module 106, a current regulator 108 and a torque calculator 110. The variable magnetization machine controller 100 further includes a rotary frame/stationary frame component 112, a stationary frame/rotary frame component 114, a pulse width modulator (PWM) voltage invertor 116 and a stator flux linkage observer 118. The variable magnetization machine controller 100 is electrically coupled to the variable magnetization machine 10 as shown. As can be appreciated from FIGS. 2 and 3, FIG. 2 illustrates examples of features of the ordinary control module 102, the magnetization current pulse control module 104 and the reducing current control module 106, but does not illustrate the torque calculator 110, the pulse width modulator (PWM) voltage invertor 116 and the stator flux linkage observer 118 shown in FIG. 3.

The variable magnetization machine controller 100 preferably includes at least one microcomputer with a control program that controls the components of the variable magnetization machine controller 100 as discussed below. The variable magnetization machine controller 100 includes other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the variable magnetization machine controller 100 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. Furthermore, the variable magnetization machine controller 100 can communicate with the variable magnetization machine 10 in any suitable manner as understood in the art. In addition, although several of the components of the variable magnetization machine controller 100 are described as modules, these components need not be individual or separate components, and one component or module can perform the operations of multiple components or modules discussed herein. Also, each module can include a microcontroller as discussed above or multiple modules can share one or more microcontrollers.

Figure 2:
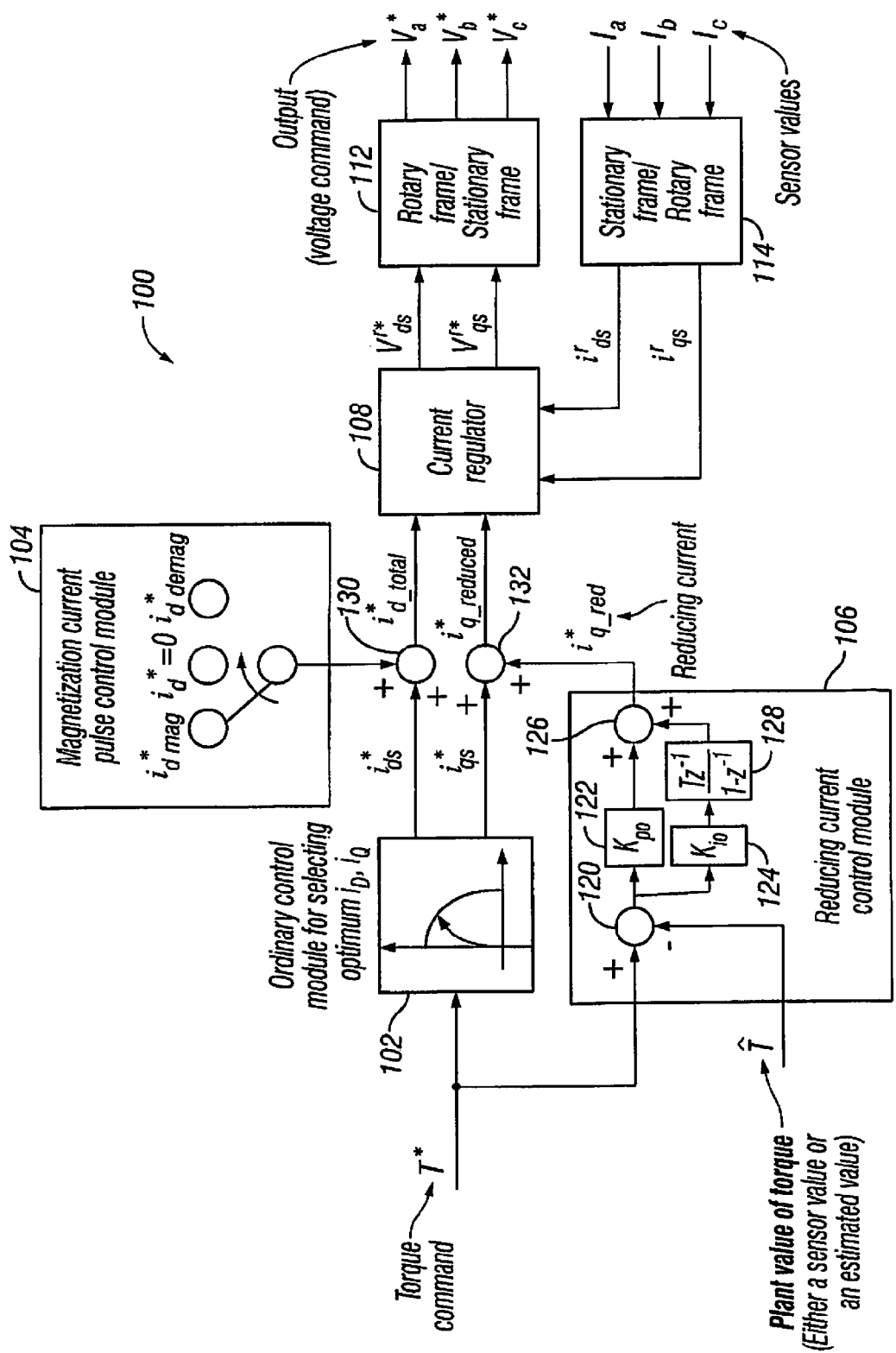
FIG. 2 is an exemplary block diagram of components of a variable magnetization machine controller according to a disclosed embodiment.
Figure 3:
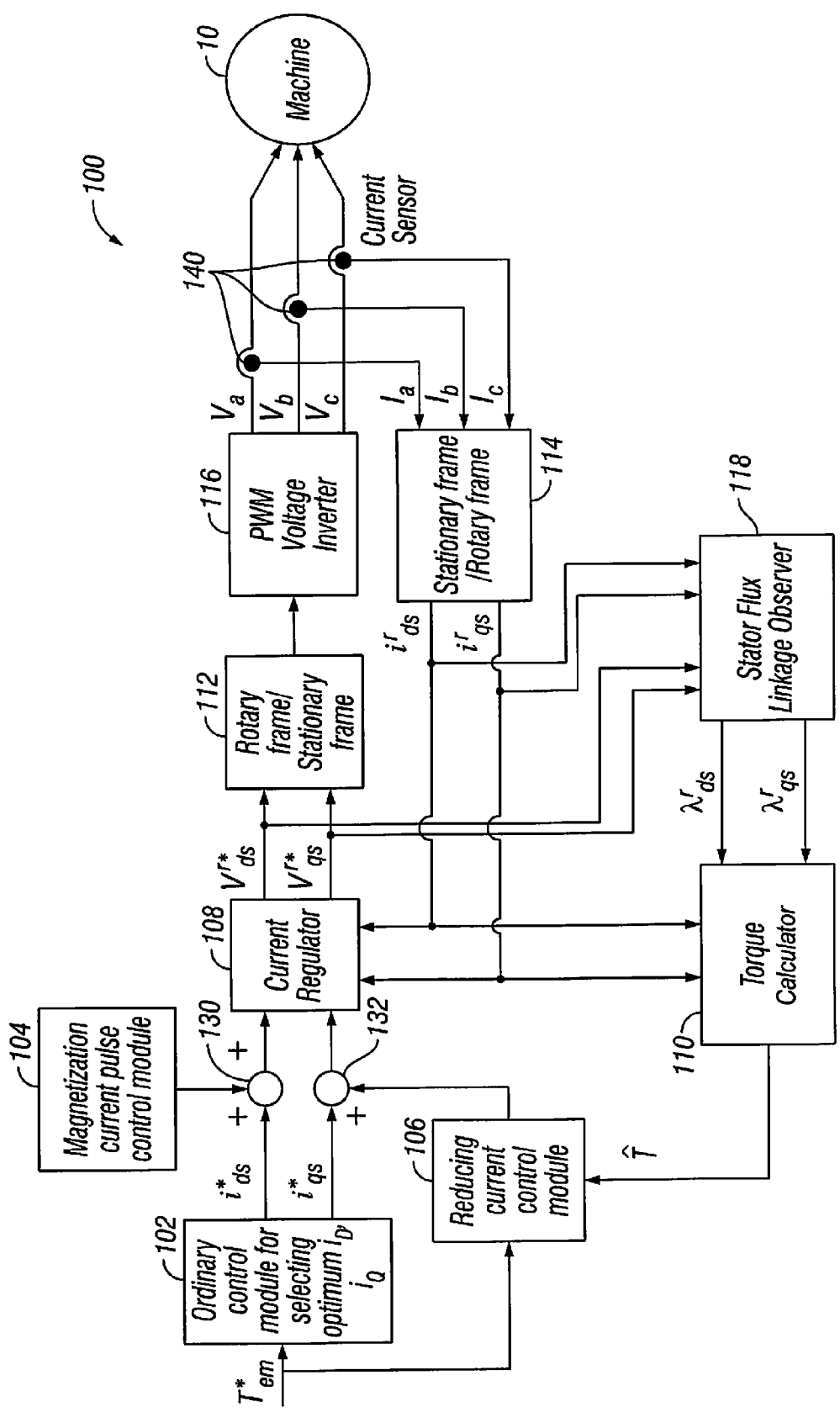
FIG. 3 is an exemplary block diagram illustrating the components shown in FIG. 2 and additional components of the variable magnetization machine controller according to a disclosed embodiment.

As shown in FIGS. 2 and 3, the ordinary control module 102 and the reducing current control module 106 receive a torque command T* from, for example, a controller (not shown) in response to, for example, a driver of the vehicle attempting to accelerate the vehicle. In response, the ordinary control module 102 outputs a d-axis current signal $i^*_{ds}$ and a q-axis current signal $i^*_{qs}$ for selecting the optimum d-axis current $i_d$ and the optimum q-axis current $i_q$. Thus, the ordinary control module 102, which can also be referred to as a current command module, computes a vector current command in a dq axis based on a torque command T*. For example, the reducing current module 106 in this example computes the reducing current based on a difference between the torque command T* and the estimated torque T. This can provide a feedback system with an easier calculation.

That is, as shown in more detail in FIG. 2, the reducing current control module 106 in this example includes a subtractor 120 that subtracts the value of a sensed or estimated torque T from the value of the torque command T* and outputs this difference to a plurality of gain components 122 and 124. For example, as shown in FIG. 3, the value of torque T can be provided by the torque calculator 110 as discussed in more detail below. The output of gain component 122 is provided to an adder 126 and the output of the gain component 124 is provided to a z-transform component 128. The adder 126 therefore adds the output of the gain component 122 and the output of the z-transform component 128 to produce a reducing current signal $i^*_{q\_red}$. Thus, the reducing current control module 106, also referred to simply as a reducing current module, applies a reducing current to a q-axis current of the vector current command based on the torque command and one of an estimated torque of the variable magnetization machine and a measured torque of the variable magnetization machine 10. Thus, the variable magnetization machine controller 100 is insensitive or substantially insensitive to a parameter deviation or differences in each variable magnetization machine 10.

As shown in FIGS. 2 and 3, the ordinary control module 102 outputs the d-axis current signal $i^*_{ds}$ to an adder 130 and the q-axis current signal $i^*_{qs}$ to an adder 132. As further shown in FIG. 2, the magnetization current pulse control module 104 includes circuitry for providing one of three signals in this example. Namely, the magnetization current pulse control module 104 can output a signal $i^*_{d\,mag}$ which the adder adds to the d-axis current signal $i^*_{ds}$, a value of 0 which the adder adds to the d-axis current signal $i^*_{ds}$ (i.e., no change to the d-axis current signal $i^*_{ds}$) or a signal $i^*_{d\,demag}$ as discussed below. Thus, the magnetization current pulse control module 104 can be configured to vary an amplitude of the magnetization control pulse according to the vector current command output by the control module 102, which can also be referred to as the current command module. This enables the magnetization or demagnetization to be performed independent of the torque condition of the variable magnetization machine 10. The magnetization current pulse control module 104, which can also be referred to as a magnetization module, applies the magnetization control pulse to a d-axis current of the vector current command. Also, to simplify the calculations, the magnetization current pulse control module 104 can set the amplitude of the magnetization control pulse to a value such that a sum of the magnetization control pulse and a value of current $i_d^*$ provide a d-axis current which obtains a prescribed magnetization level for the variable magnetization machine 10.

Furthermore, as shown in FIGS. 2 and 3, the adder 132 adds the reducing current signal $i^*_{q\_red}$ to the q-axis current signal $i^*_{qs}$ to produce a reduced current signal $i^*_{q\_reduced}$. The adders 130 and 132 provide their outputs to the current regulator 108, which provides d-axis current voltage signal $V^{r*}_{ds}$ and q-axis current voltage signal $V^{r*}_{qs}$ to the rotary frame/stationary frame component 112. In this example, the rotary frame/stationary frame component 112 provides the voltage signals to the PWM voltage inverter 116, which provides voltages $V_a$, $V_b$ and $V_c$ to the three poles of the variable magnetization machine 10.

The variable magnetization machine controller 100 further includes current sensors 140 that sense the currents associated with $V_a$, $V_b$ and $V_c$ being applied to the variable magnetization machine 10. The current sensors 140 provide the sensed current signals $I_a$, $I_b$ and $I_c$ to the stationary frame/rotary frame component 114. The stationary frame/rotary frame component 114 thus provides a detected d-axis current signal $i^r_{ds}$ and a detected q-axis current signal $i^r_{qs}$ to the current regulator 108 and the torque calculator 110. As understood in the art, the current regulator 108 regulates the d-axis current voltage signal $V^{r*}_{ds}$ and q-axis current voltage signal $V^{r*}_{qs}$ based on the d-axis current signal $i^r_{ds}$ and the detected q-axis current signal $i^r_{qs}$ that are fed back from the stationary frame/rotor frame component 114.

Figure 4:
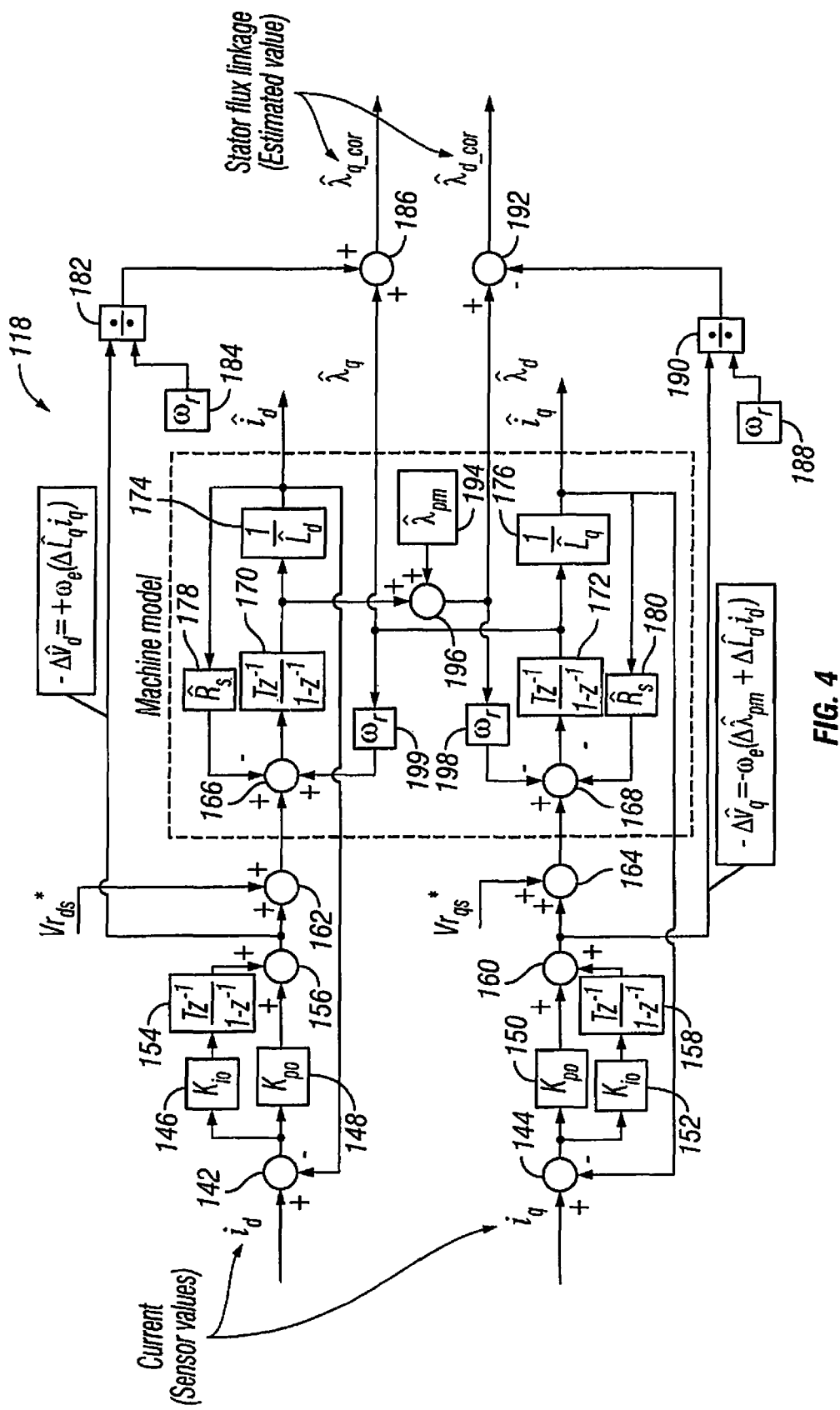
FIG. 4 is an exemplary block diagram of the stator flux linkage observer shown in FIG. 3.

As further shown in FIG. 3 and in more detail in FIG. 4, the stator flux linkage observer 118, which can also be referred to as a stator flux linkage estimator, can be configured to estimate the stator flux linkage by adding a compensation value that is obtained from an L(Y-Yh) reference in a Luenburger style observer for machine electrical state variables associated with the variable magnetization machine 10. That is, a compensation value that is obtained from a value that is a difference between an output of an observer and a plant can be added with a compensation of a proportional integral (PI) controller, and this sum is then added to a state of the observer to produce a Luenburger style observer.

This can provide more accurate torque estimation, and reduce pulsating torque. In this example, the stator flux linkage observer 118 receives the d-axis current signal $i^r_{ds}$ and the detected q-axis current signal $i^r_{qs}$ and provides these signals to subtractors 142 and 144. The subtractor 142 provides an output to gain components 146 and 148, and the subtractor 144 provides an output to gain components 150 and 152. The output of the gain component 146 is provided to a z-transform component 154 and the output of the gain component 148 is provided to an adder 156. The adder 156 therefore adds the output of the gain component 148 and the output of the z-transform component 154. Likewise, the output of the gain component 152 is provided to a z-transform component 158 and the output of the gain component 150 is provided to an adder 160. The adder 160 therefore adds the output of the gain component 150 and the output of the z-transform component 158.

The output of the adder 156 is provided to an adder 162 which adds that output to the d-axis current voltage signal $V^{r*}_{ds}$ that is output by the current regulator 108 as discussed above. Also, the output of the adder 160 is provided to an adder 164 which adds that output to the q-axis current voltage signal $V^{r*}_{dq}$ that is output by the current regulator 108. The output of the adder 162 is provided to an adder/subtractor 166 and the output of the adder 164 is provided to an adder/subtractor 168. The output of the adder/subtractor 166 is provided to a z-transform component 170 and the output of the adder/subtractor 168 is provided to a z-transform component 172. The output of the z-transform component 170 is provided to inductance component 174, which provides an output d-axis current signal $i_d$. The output of the z-transform component 172 is provided to inductance component 176, which provides an output q-axis current signal $i_q$. Furthermore, the output of the inductance component 174 is fed back via resistance component 178 to the adder/subtractor 166, and the output of inductance component 174 is fed back via resistance component 180 to adder/subtractor 168.

As further shown, the output of the adder 156 is provided to a divider 182 which divides the output of adder 156 with a sensed or estimated rotation signal $\omega_r$ of the rotor 12 output by component 184 and provides an output to an adder 186. Also, the output of adder 160 is provided to a divider 190 which divides the output of the adder 160 with a sensed or estimated rotation signal $\omega_r$ of the rotor 12 output by a component 188 and provides an output to a subtractor 192.

As further shown in FIG. 4, a component 194 provides a signal to an adder 196. The adder 196 adds the output of the signal from the component 194 to a signal provided by the z-transform component 170. The output of the adder 196 is provided to a component 198 which provides an output to the adder 168. Hence, the adder/subtractor 168 subtracts the signal provided by a component 180 from the signals provided by the adder 164 and the component 198 to provide the output signal to the z-transform component 172. The output of the z-transform component 172 is further provided to a component 199 and to adder 186. Hence, the adder/subtractor 166 subtracts the output of the component 178 from the signals provided by the adder 162 and the component 199 to provide the output signal to the z-transform component 170.

Furthermore, the adder 186 adds the output of the component 199 to the output of divider 182 to provide an estimated stator flux linkage signal $\lambda_{q\_cor}$, and the subtractor 192 subtracts the output of divider 190 form the output of adder 196 to provide an estimated stator flux linkage signal $\lambda_{d\_cor}$. Accordingly, the torque calculator 110 shown in FIG. 3 calculates the value of a sensed or estimated torque T based on the estimated stator flux linkage signals $\lambda_{d\_cor}$ and $\lambda_{q\_cor}$ (which are represented by $\lambda^r_{ds}$ and $\lambda^r_{qs}$ in FIG. 3), the detected d-axis current signal $i^r_{ds}$ and the detected q-axis current signal $i^r_{qs}$ that are fed back from the stationary frame/rotor frame component 114.

Figure 5:
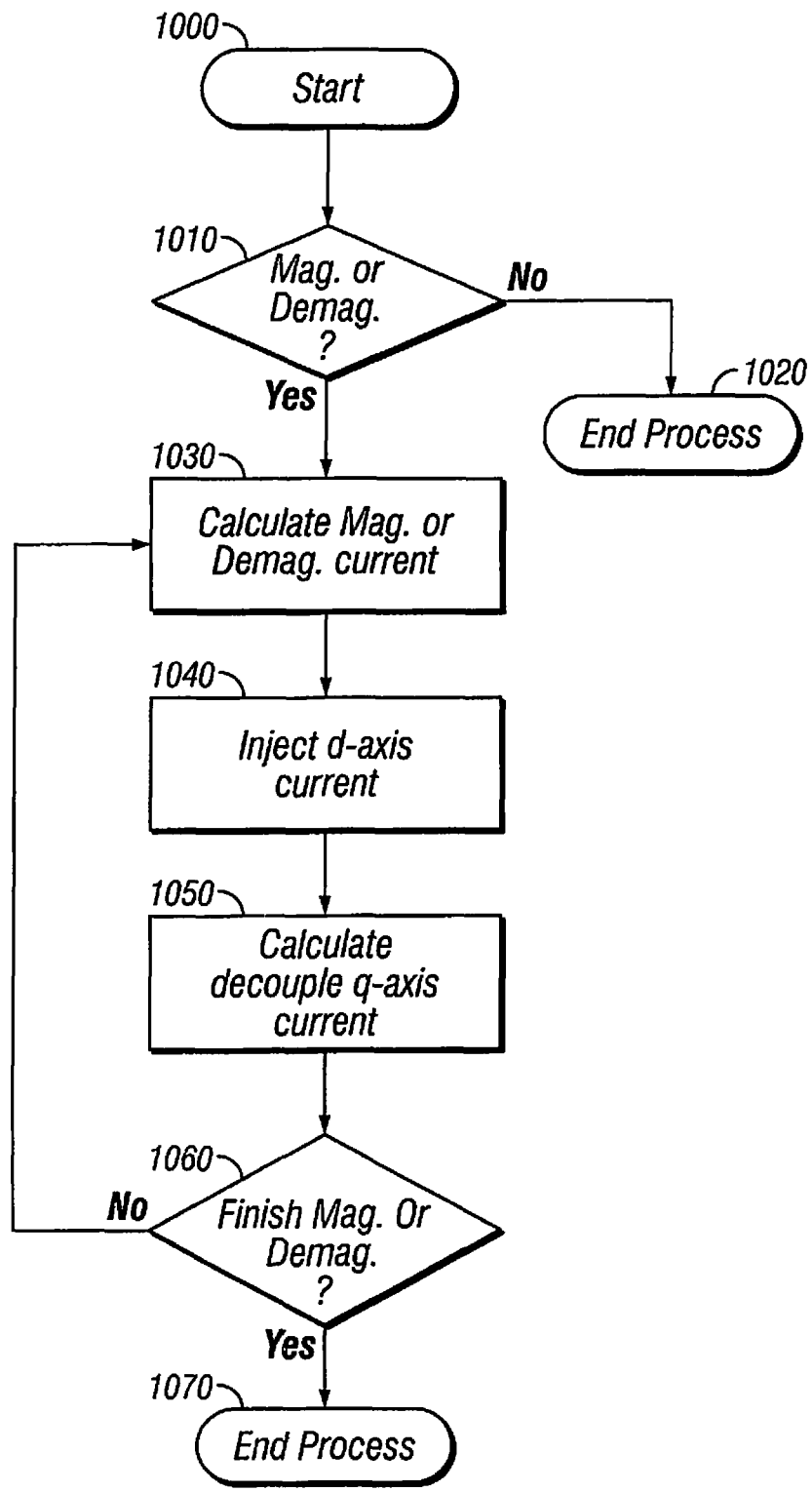
FIG. 5 is a flowchart illustrating an example of operations performed by the variable magnetization machine controller shown in FIG. 3.

FIG. 5 is a flowchart illustrating an example of operations performed by the variable magnetization machine controller 100 and by the other embodiments of the variable magnetization machine controller described herein. These operations can be performed by the controller or controller incorporated into the components of the variable magnetization machine controller 100 as discussed above.

After beginning the process in Step 1000, the process determines whether the variable magnetization machine 10 is to be magnetized or demagnetized. If not, the process ends in step 1020. However, if the variable magnetization machine 10 is to be magnetized or demagnetized, the processing calculates the magnetization or demagnetization current in step 1030. In step 1040, the variable magnetization machine controller 100 applies the d-axis current to the variable magnetization machine 10 in the manner described above with regard to FIGS. 2 through 4. In step 1050, the processing calculates the decouple q-axis current. Then, the processing determines in step 1060 whether the magnetization or demagnetization process has been completed. If so, the processing ends in step 1070. However, if the magnetization or demagnetization process has not been completed, the processing returns to step 1030 and repeats as discussed above.

Figure 6:
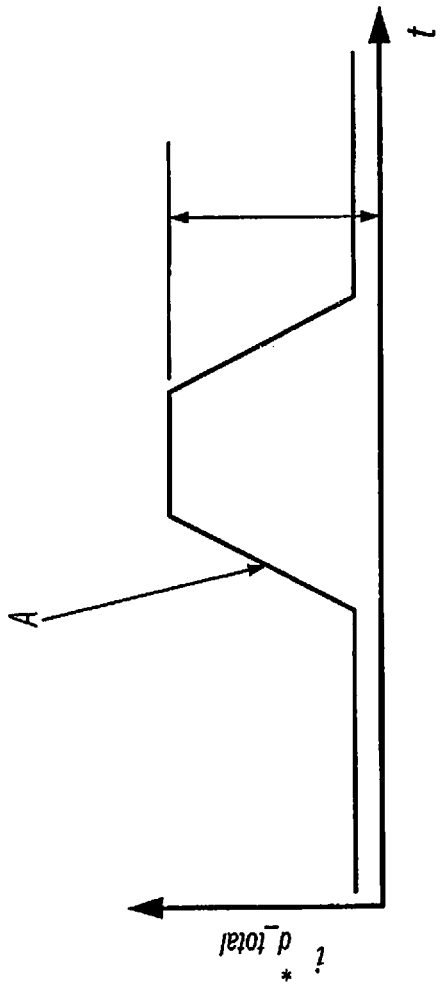
FIG. 6 is a graph illustrating an example of a d-axis current signal in relation to time as output by the variable magnetization machine controller shown in FIG. 3 for a small d-axis current signal.
Figure 7:
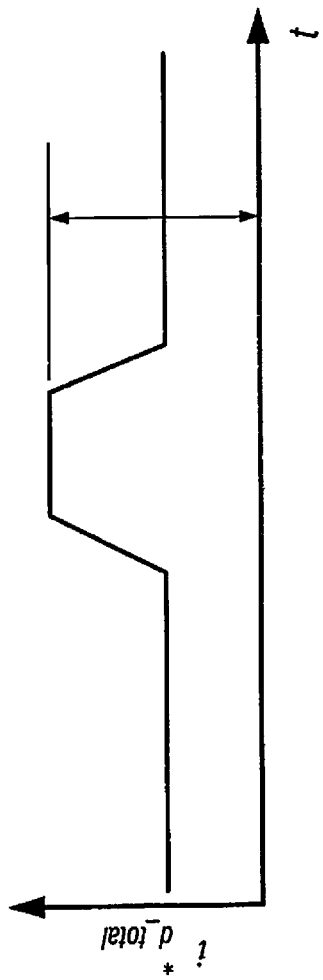
FIG. 7 is a graph illustrating an example of a d-axis current signal in relation to time as output by the variable magnetization machine controller shown in FIG. 3 for a large d-axis current signal.

As shown in FIGS. 6 and 7, the height of the pulse A of the current signal output by adder 130 shown in FIGS. 2 and 3 is regulated so that the peak value of the pulse can achieve the value to successively obtain a desired magnetization level of the variable magnetization machine 10. As can be appreciated from FIGS. 6 and 7, the variation of the level of the current signal is greater for a small current value as shown in FIG. 6 than for a large current value as shown in FIG. 7.

Figure 8:
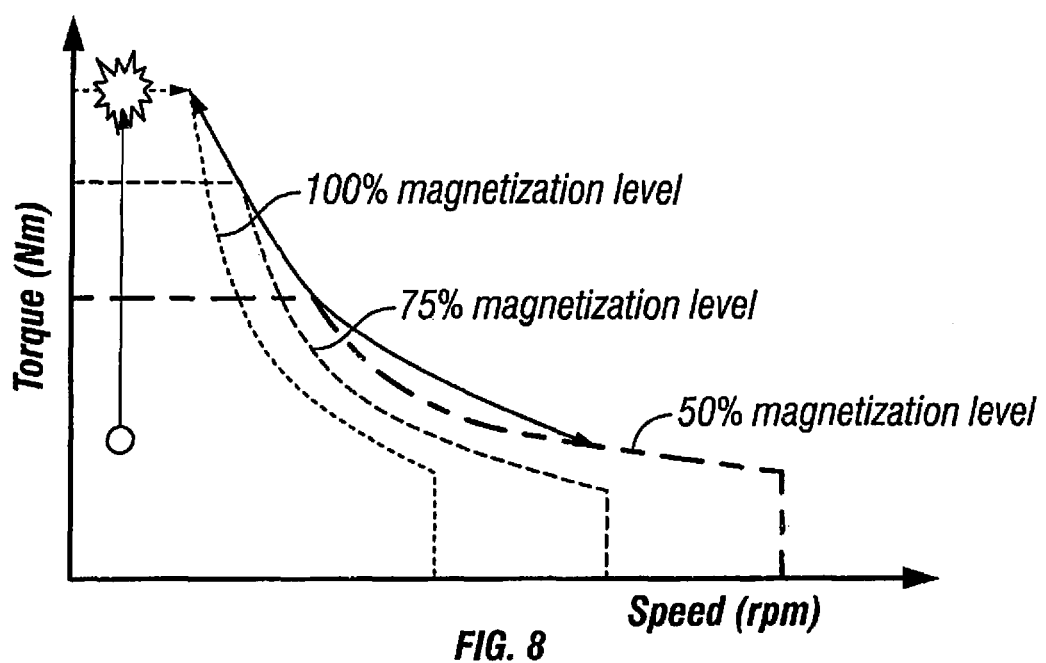
FIG. 8 is a graph illustrating an example of torque of the variable magnetization machine in relation to speed of the variable magnetization machine as shown in FIG. 1.
Figure 9:
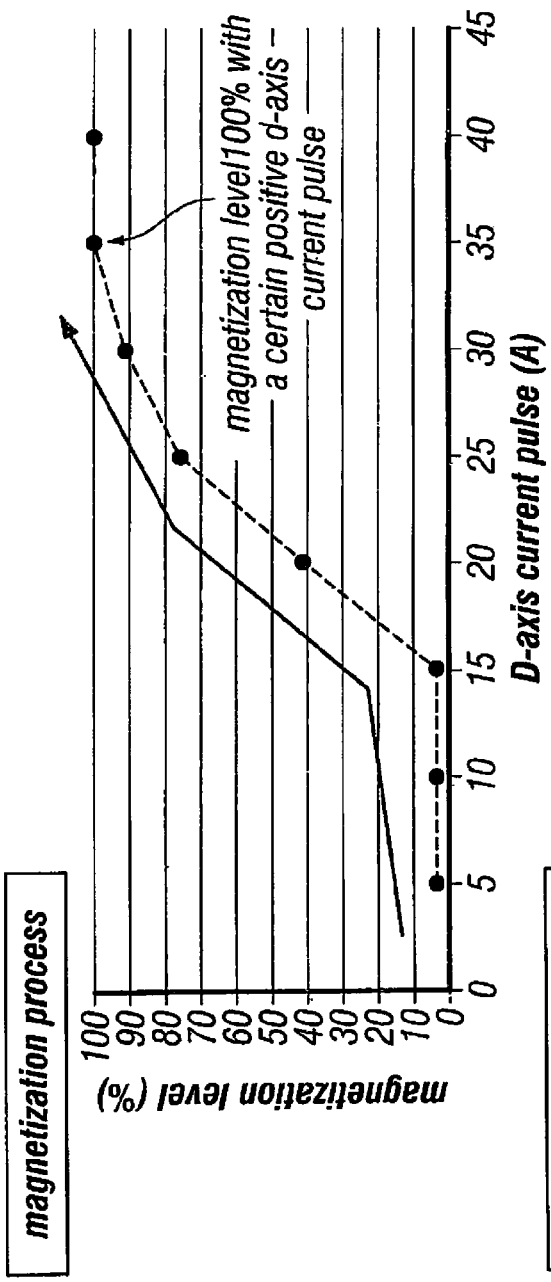
FIG. 9 is a graph illustrating an example of the magnetization level in relation to a d-axis current pulse during magnetization of the variable magnetization machine as shown in FIG. 1.
Figure 10:
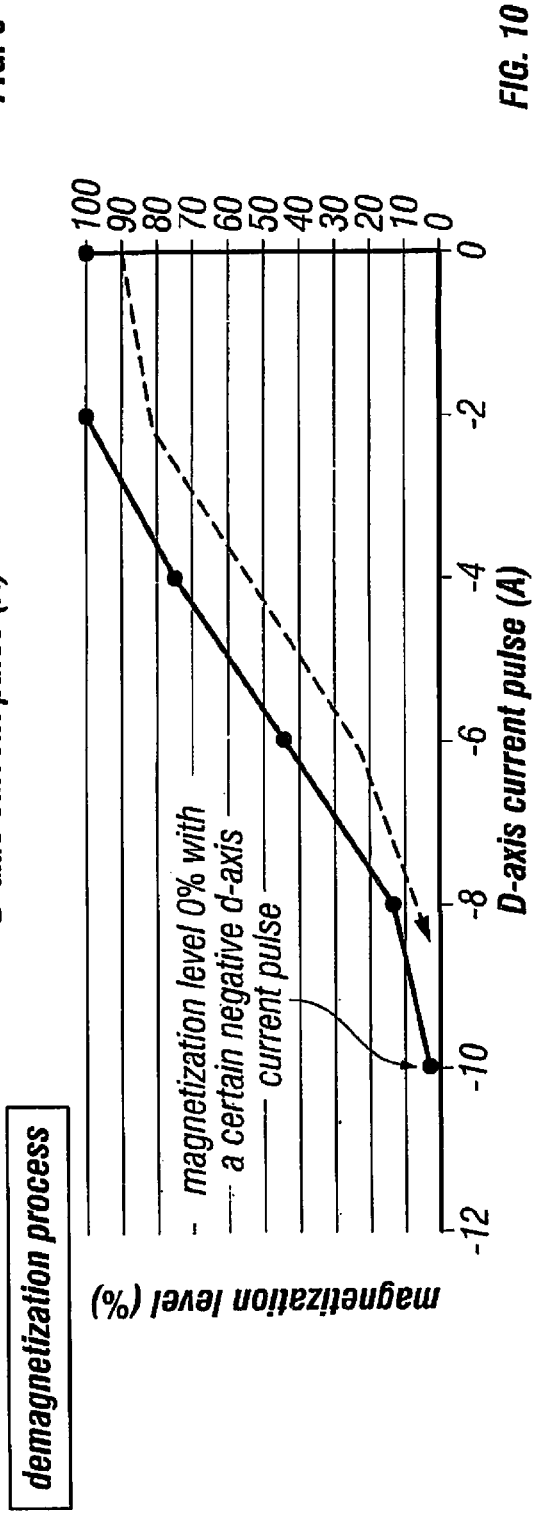
FIG. 10 is a graph illustrating an example of the magnetization level in relation to a d-axis current pulse during demagnetization of the variable magnetization machine as shown in FIG. 1.

FIG. 8, on the other hand, illustrates an example of the relationship between the torque of the variable magnetization machine 10 and speed of the variable magnetization machine 10 for a 50% magnetization level, a 75% magnetization level and a 100% magnetization level. Thus, variable magnetization machine controller 100 can control the magnetization level of the variable magnetization machine 10 can be in order to have a full torque output when, for example, acceleration of the vehicle is needed to pass another vehicle. The magnetization level can be increased up to 100% for max torque production, and the speed of the vehicle can be increased to a high speed while the variable magnetization machine 10 is being demagnetized. In this example, torque increases by 25% with a same current amplitude, which means that the magnetization level of the variable magnetization machine 10 increases. Furthermore, FIG. 9 is a graph illustrating an example of the magnetization level in relation to a d-axis current pulse during magnetization of the variable magnetization machine 10, and FIG. 10 is a graph illustrating an example of the magnetization level in relation to a d-axis current pulse during demagnetization of the variable magnetization machine 10.

Therefore, as can be appreciated from the descriptions herein, the variable magnetization machine controller 100 controls the magnetization level of the variable magnetization machine 10 by controlling the d-axis current pulse while controlling the q-axis current to keep torque constant. The operations performed by the variable magnetization machine controller 100 can be insensitive to the difference in each machine or the parameter deviations of the machines and is implemented easily and quickly.

FIG. 11 is a graph illustrating an example of the behavior of the d-axis current signal during a magnetization process of the variable magnetization machine 10 as performed by the embodiments of the variable magnetization machine controller as compared to conventional magnetization processes. As can be appreciated from FIG. 11, the amplitude of the q-current $i_q$ due to the operations of the variable magnetization machine controller 100 and the other embodiments discussed herein is less than for the conventional techniques during the magnetization process. Also, as can be appreciation from FIG. 12, the amplitude of the q-current $i_q$ due to the operations of the variable magnetization machine controller 100 and the other embodiments discussed herein is greater than for the conventional techniques during the demagnetization process. Hence, as can be appreciated from FIG. 8, the speed of the variable magnetization machine 10 can be increased more rapidly at the lower magnetization level that can be more effectively achieved as shown in FIG. 12.

Figure 13:
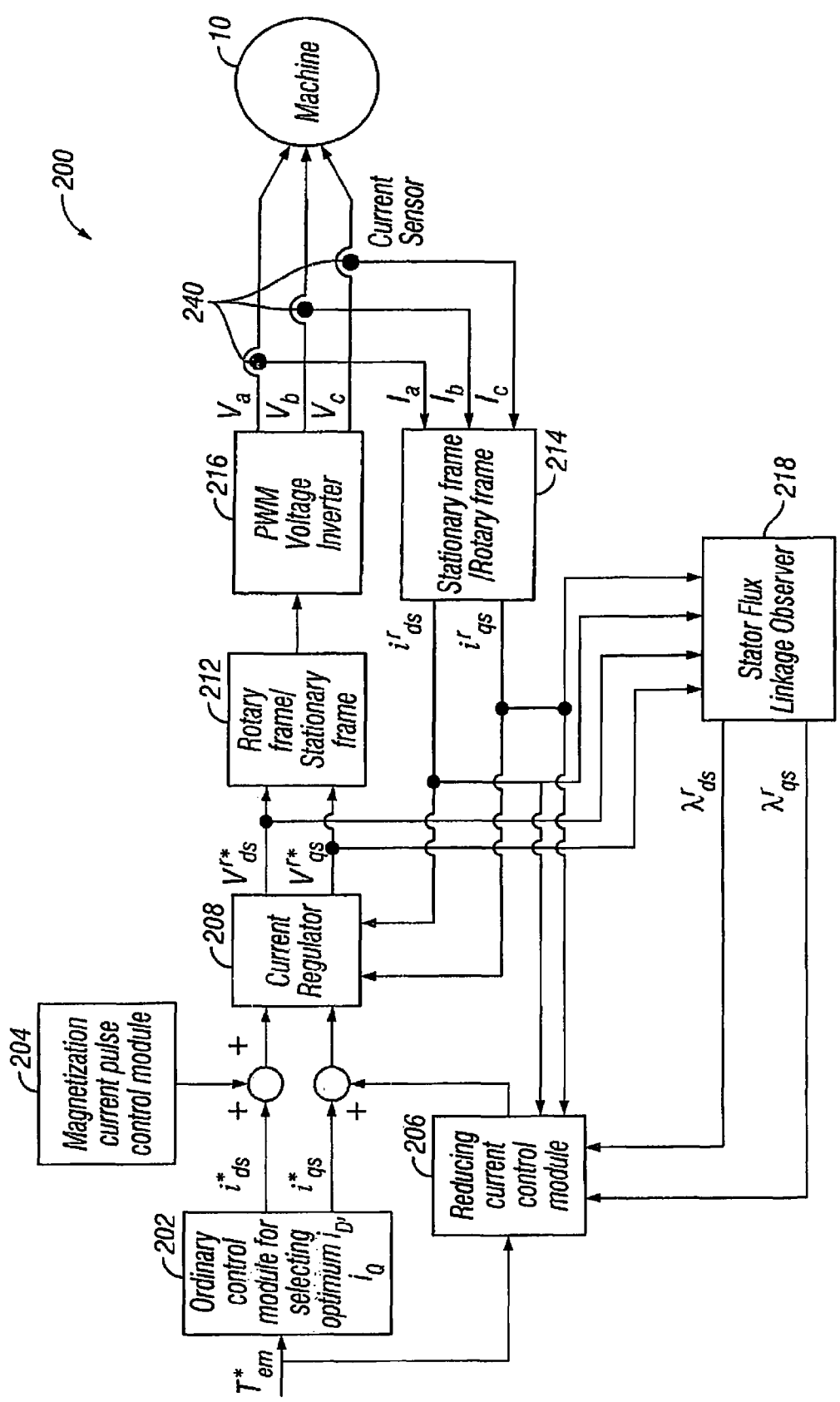
FIG. 13 is an exemplary block diagram illustrating components of the variable magnetization machine controller according to another disclosed embodiment.
Figure 14:
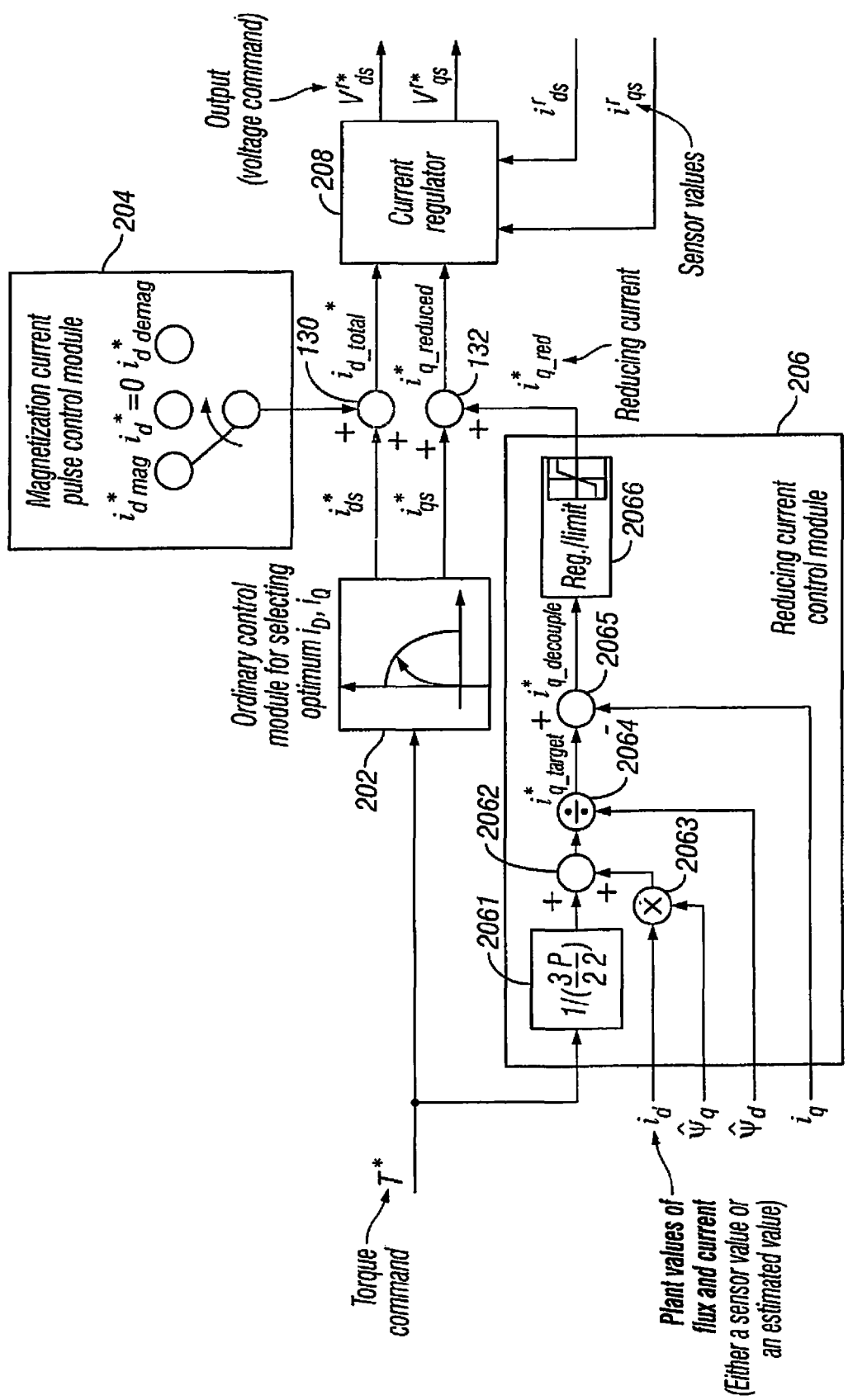
FIG. 14 is an exemplary block diagram illustrating examples of the ordinary control module, magnetization current pulse control module, reducing current control module and current regulator of the variable magnetization machine controller shown in FIG. 13.

Another disclosed embodiment is shown in FIGS. 13 and 14. The variable magnetization machine controller 200 is electrically coupled to the variable magnetization machine 10 and includes an ordinary control module 202, a magnetization current pulse control module 204, a reducing current control module 206, a current regulator 208 and a torque calculator 210. The variable magnetization machine controller 200 further includes a rotary frame/stationary frame component 212, a stationary frame/rotary frame component 214, a pulse width modulator (PWM) voltage invertor 216, a stator flux linkage observer 218 and current detectors 240. Except for the reducing current control module 206 as discussed below, the components 202, 204, 208, 210, 212, 214, 216, 218 and 240 are configured the same or in a similar manner as corresponding components 102, 104, 108, 110, 112, 114, 116, 118 and 140 of the variable magnetization machine controller 100 discussed above and thus, their descriptions are not repeated here.

In this embodiment, the reducing current control module 206 can calculate the reducing current signal $i^*_{q\_red}$ based on the sensed or estimated stator flux linkage signals $\lambda^r_{ds}$ and $\lambda^r_{qs}$ (which are represented by $\psi_d$ and $\psi_q$ in FIG. 14), the detected d-axis current signal $i^r_{ds}$ and the detected q-axis current signal $i^r_{qs}$ that are fed back from the stationary frame/rotor frame component 114 (which are represented by $i_d$ and $i_q$ in FIG. 14). That is, as shown in FIG. 13, the reducing current control module 206 includes a component 2061 that receives the torque command T* and provides an output to an adder 2062. Considering the equation $$T^* = \frac{3}{2}\frac{P}{2}(\hat{\psi}_d i_q - \hat{\psi}_q i_d)$$

and since the torque command is known and stator flux linkage observer 218 indicates values of $\psi_d,\psi_q$, the target value for the q-axis current can be calculated as $$i_{q\_target} = \left(T^* \Big/ \left(\frac{3}{2}\frac{P}{2}\right) + i_d\psi_q\right)\Big/\psi_d$$

and the reducing value for the 1-axis current is given as;

$$i_{q\_decouple} = i_{i\_target} - i_{q\_measured}.$$

The reducing current control module 206 further includes a multiplier 2063 that multiplies signals $i_d$ and $\psi_q$ and provides the multiplied signal to adder 2062. The adder 2062 sends the added signal to a divider 2064 that divides the added signal with signal $\psi_d$ and provides an output signal $i^*_{q\_target}$ to a subtractor 2065. The subtractor 2065 subtracts the signal $i_q$ from the signal $i^*_{q\_target}$ to provide an output signal $i^*_{q\_decouple}$. The signal $i^*_{q\_decouple}$ is provided to a regulator/limiter 2066, which provides the output signal reducing current signal $i^*_{q\_red}$ to the adder 132.

Figure 15:
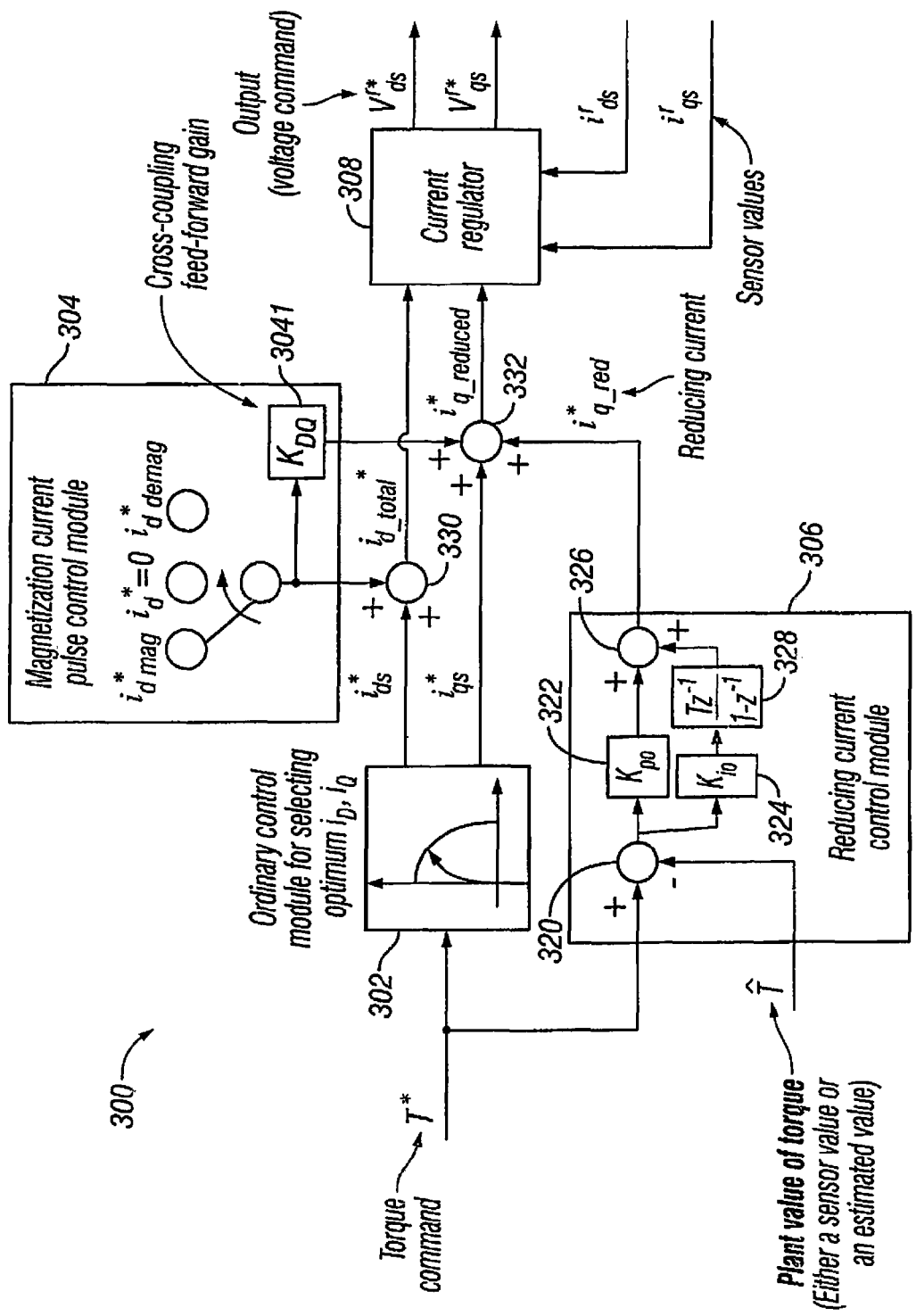
FIG. 15 is an exemplary block diagram illustrating examples of the ordinary control module, magnetization current pulse control module, reducing current control module and current regulator of another embodiment of the variable magnetization machine controller.

Another disclosed embodiment is shown in FIG. 15. The variable magnetization machine controller 300, a portion of which is shown in FIG. 15, is electrically coupled to the variable magnetization machine 10 (not shown in FIG. 15). In this example, the variable magnetization machine controller 300 includes an ordinary control module 302, the magnetization current pulse control module 304, the reducing current control module 306, the current regulator 308 and the adders 330 and 332. The variable magnetization machine controller 300 further includes other components similar to those of the variable magnetization machine controller 100 discussed above such as a rotary frame/stationary frame component 112, a stationary frame/rotary frame component 114, a pulse width modulator (PWM) voltage invertor 116, a stator flux linkage observer 118, current detectors 140 and other components as discussed above with regard to FIGS. 2 through 4. Except for the magnetization current pulse control module 304 and the adder 332 as discussed below, the components 302, 306, 308, 320, 322, 324, 326, 328, 330 and the other components not shown are configured the same or in a similar manner as corresponding components 102, 106, 108, 120, 122, 124, 126, 128, 130 and the other components of the variable magnetization machine controller 100 discussed above and thus, their descriptions are not repeated here.

As shown in FIG. 15, the magnetization current pulse control module 304 includes a cross-coupling feed-forward gain component 3041, which provides a gain signal to adder 332. The adder 332 therefore adds the gain signal to the q-axis current signal $i^*_{qs}$ and the reducing current signal $i^*_{q\_red}$, and provides the reduced current signal $i^*_{q\_reduced}$ to the current regulator 308 which operates as discussed above.

Figure 16:
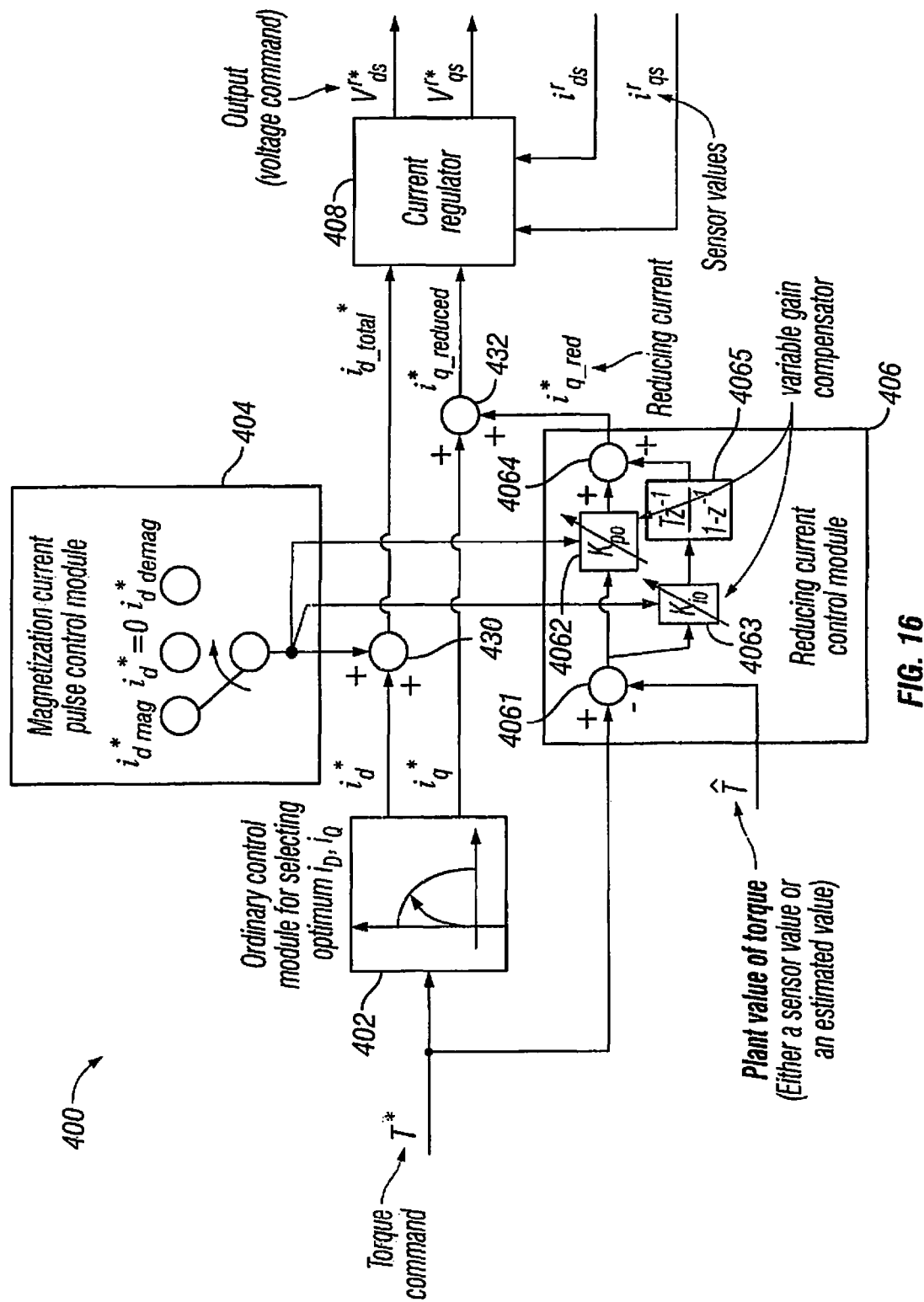
FIG. 16 is an exemplary block diagram illustrating examples of the ordinary control module, magnetization current pulse control module, reducing current control module and current regulator of another embodiment of the variable magnetization machine controller.

Another disclosed embodiment is shown in FIG. 16. The variable magnetization machine controller 400, a portion of which is shown in FIG. 16, is electrically coupled to the variable magnetization machine 10 (not shown in FIG. 16). In this example, the variable magnetization machine controller 400 includes an ordinary control module 402, the magnetization current pulse control module 404, the reducing current control module 406, the current regulator 408 and adders 430 and 432 of the variable magnetization machine controller 400. The variable magnetization machine controller 400 further includes other components similar to those of the variable magnetization machine controller 100 discussed above such as a rotary frame/stationary frame component 112, a stationary frame/rotary frame component 114, a pulse width modulator (PWM) voltage invertor 116, a stator flux linkage observer 118, current detectors 140 and other components as discussed above with regard to FIGS. 2 through 4. Except for the magnetization current pulse control module 404 and the reducing current control module 406 as discussed below, the components 402, 408, 430 and 432, and the other components not shown, are configured the same or in a similar manner as corresponding components 102, 108, 130, 132 and the other components of the variable magnetization machine controller 100 discussed above and thus, their descriptions are not repeated here.

As further shown in FIG. 16, the reducing current control module includes a subtractor 4061 that subtracts the torque signal T from the torque command T* and provides an output signal to variable gain compensators 4062 and 4063. The gains of the variable gain compensators 4062 and 4063 are controlled based on the signal output by magnetization current pulse control module 404 (magnetization module) as indicted. Thus, the magnetization module 404 provides a magnetization control pulse to regulate a gain of proportional-integral compensators 4062 and 4063 according to a value of the magnetization control pulse. This can provide a wide bandwidth in a broader operating condition, and thus suppress pulsating torque. The reducing current control module 406 can thus add a reducing current to the q-axis current according to the magnetization control pulse that the magnetization module 404 outputs. This can reduce the magnitude of the reducing current, which has a lag because of feed back, and can make up for the amount by feed forward, thus reducing pulsating torque in the variable magnetization machine 10.

Figure 18:
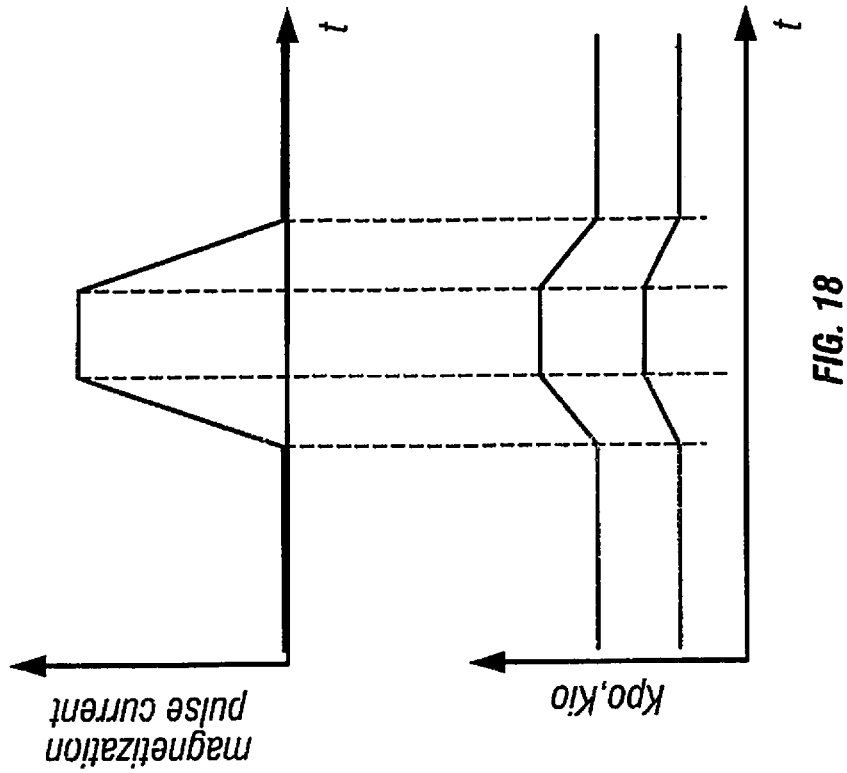
FIG. 18 is a graph illustrating an example of the magnetization pulse current output by an embodiment of the variable magnetization machine controller when controlling a negative salient variable magnetization machine.
Figure 17:
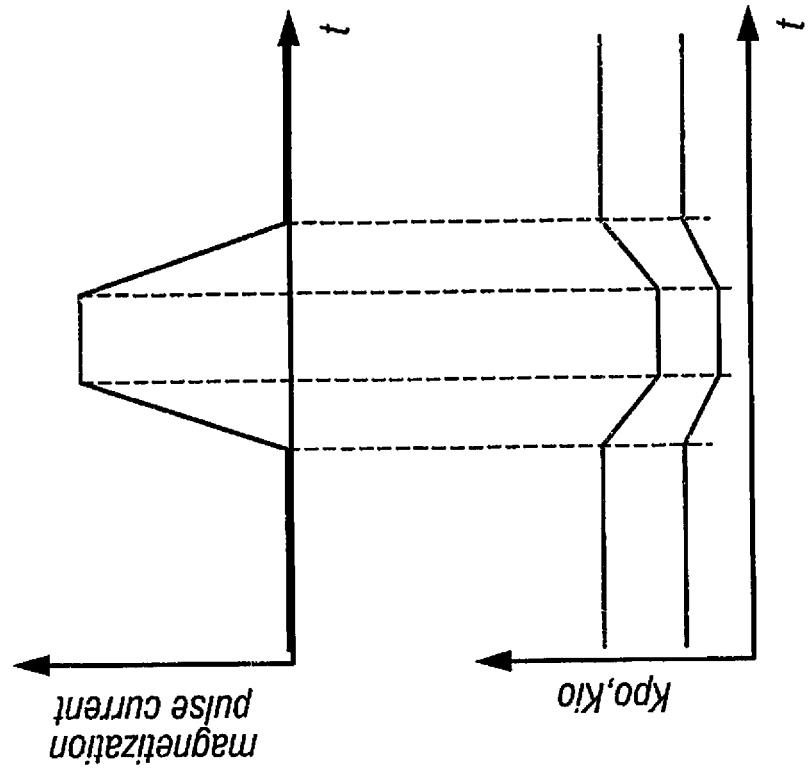
FIG. 17 is a graph illustrating an example of the magnetization pulse current output by an embodiment of the variable magnetization machine controller when controlling a positive salient variable magnetization machine.

The outputs of variable gain compensator 4062 is provided to an adder 4064, and the output of variable gain compensator 4063 is provided to a z-transform component 4065. The adder 4064 adds the output of the variable gain compensator 4062 and the z-transform component 4065. The output of the adder 4064 is provided as the reducing current signal $i^*_{q\_red}$ to the adder 432. The adder 432 therefore adds the gain signal to the q-axis current signal $i^*_{qs}$ and the reducing current signal $i^*_{q\_red}$, and provides the reduced current signal $i^*_{q\_reduced}$ to the current regulator 408 which operates as discussed above. Thus, as can be appreciated from the above and the graphs in FIGS. 17 and 18, the reducing current control module 406 can operate to reduce a gain for a positive pulse for the variable magnetization machine 10 configured as a positive salient pole machine, and to increase the gain for the positive pulse for the variable magnetization machine 10 configured as a negative salient pole machine. This can stabilize the control module 406 in a broader operating condition of the variable magnetization machine 10.

Figure 19:
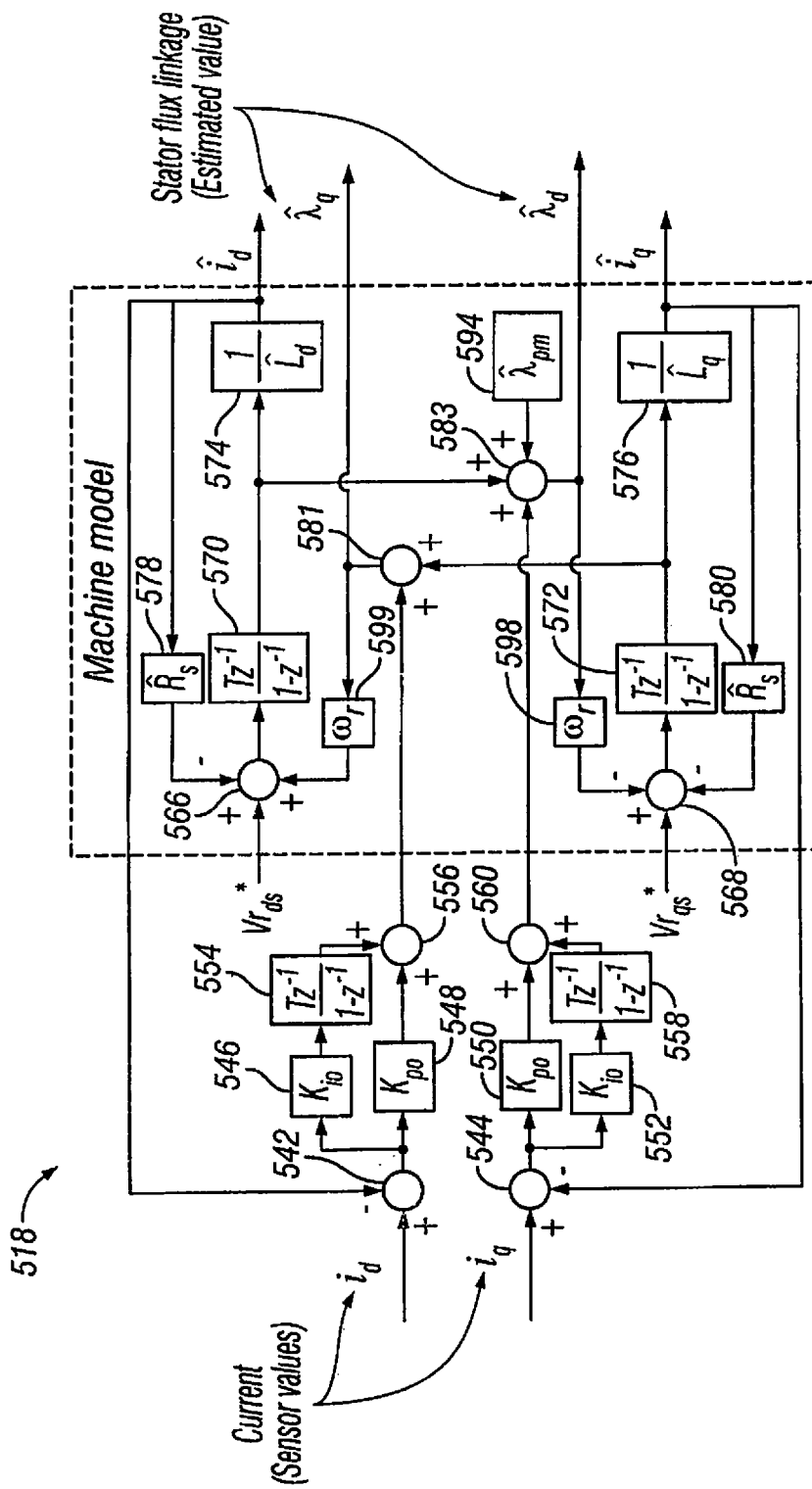
FIG. 19 is an exemplary block diagram of another embodiment of a stator flux linkage observer of a variable magnetization machine controller according to an embodiment described herein.

An example of a variation of the stator flux linkage observer 118 as shown in FIG. 4 is shown in FIG. 19. The stator flux linkage observer 518 shown in FIG. 19 receives the d-axis current signal $i^r_{ds}$ and the detected q-axis current signal $i^r_{qs}$ and provides these signals to subtractors 542 and 544. The subtractor 542 provides an output to gain components 546 and 548, and the subtractor 544 provides an output to gain components 550 and 552. The output of gain component 546 is provided to a z-transform component 554 and the output of gain component 548 is provided to an adder 556. The adder 556 therefore adds the output of the gain component 548 and the output of the z-transform component 554. Likewise, the output of gain component 552 is provided to a z-transform component 558 and the output of gain component 550 is provided to an adder 560. The adder 560 therefore adds the output of the gain component 550 and the output of the z-transform component 558. These components are similar to the corresponding components 142 through 160 as shown in FIG. 4 and described above.

As further shown in FIG. 19, the stator flux linkage observer 518 includes an adder 566 that receives the d-axis current voltage signal $V^{r*}_{ds}$ that is output by the current regulator 108 as discussed above. The stator flux linkage observer 518 further includes an adder 568 that receives the q-axis current voltage signal $V^{r*}_{qs}$ that is output by the current regulator 108. The output of adder 566 is provided to a z-transform component 570 and the output of adder 568 is provided to a z-transform component 572. The output of z-transform component 570 is provided to component 574, which provides an output d-axis current signal $i_d$. The output of the z-transform component 572 is provided to a component 576, which provides an output q-axis current signal $i_q$. Furthermore, the output of component 574 is fed back via component 578 to the adder 566, and the output of the component 576 is fed back via a component 580 to the adder 568. These components are similar to corresponding components 166 through 180 as discussed above.

As further shown, the output of the adder 556 is provided to another adder 581, and the output of the adder 560 is provided to another adder 583. The adder 581 adds the output of the adder 556 to the output of the z-transform component 572 to provide an estimated stator flux linkage signal $\lambda_{q\_cor}$ as discussed above. The adder 581 further provides this estimated stator flux linkage signal $\lambda_{q\_cor}$ to t a component 599 which provides its output to the adder 566. The adder thus adds this output the output of adder 162 and the component output to 578, and provides the added output to the z-transform component 170 as discussed above. The adder 583 adds the output of the z-transform component 570 to the output of the adder 560 and the output of component 594, and provides the added output as an estimated stator flux linkage signal $\lambda_{d\_cor}$. The adder 583 further provides the estimated stator flux linkage signal $\lambda_{d\_cor}$ to a component 598 that provides an output to the adder 568. Thus, the adder 568 adds the output of the component 598 and the output of the component 580 to the q-axis current voltage signal $V^{r*}_{qs}$ and provides the added output to the z-transform component 572.

Figure 20:
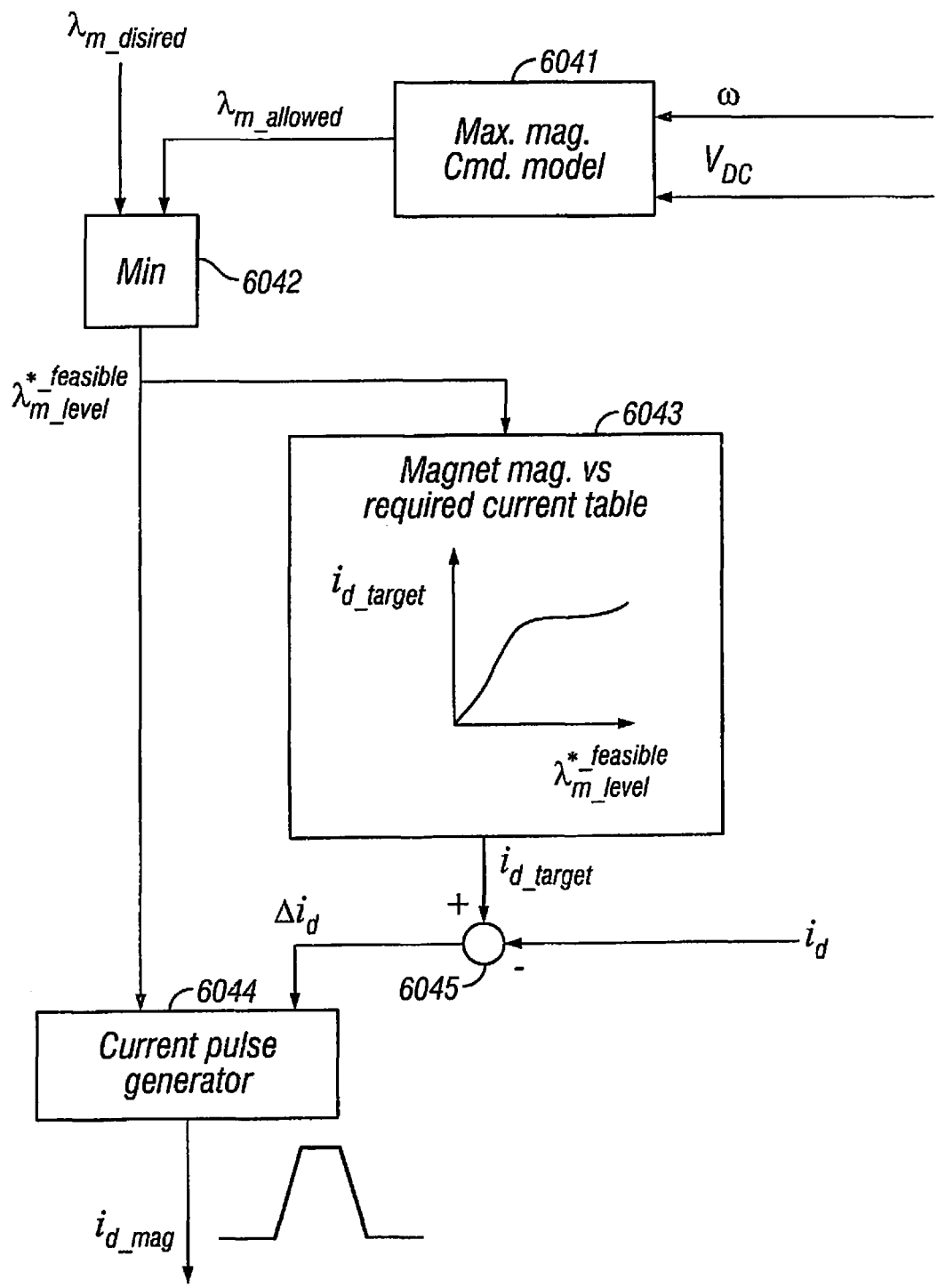
FIG. 20 is an exemplary block diagram of an example of a magnetization current pulse control module of a variable magnetization machine controller according to an embodiment described herein.

An example of a variation of the magnetization current pulse control module 104 as shown in FIG. 2 is shown in FIG. 20. The magnetization current pulse control module 604 includes a module 6041, a module 6042, a lookup table 6043, a current pulse generator 6044 and a subtractor 6045. The module 6041 determines the maximum allowed signal $\lambda_{m\_allowed}$ based on an angle signal ω representing a detected or estimated angle of the rotor 12 and a voltage signal $V_{DC}$. The module 6042 determines the minimum feasible signal $\lambda^{*}{}^{feasible}_{m\_level}$ based on the desired signal level $\lambda_{m\_desired}$ and the maximum allowed signal level $\lambda_{m\_allowed}$. The module 6042 outputs the minimum feasible signal $\lambda^{*}{}^{feasible}_{m\_level}$ the lookup table target 6043 and to the current pulse generator 6044. The lookup table 6043 outputs a target current signal $i_{d\_target}$ to subtractor 6045 based on the signal $\lambda^{*}{}^{feasible}_{m\_level}$. The subtractor subtracts the signal $i_d$ from the target signal $i_{d\_target}$ and provides a signal $\Delta i_d$ to the current pulse generator 6044. The current pulse generator 6044 outputs a pulse signal $i_{d\_mag}$ based on the signals $\lambda^{*}{}^{feasible}_{m\_level}$ and $\Delta i_d$. For example, the magnetization current pulse control module 604 outputs the pulse signal $i_{d\_mag}$ to adder 130 as shown in FIGS. 2 and 3.

Figure 21:
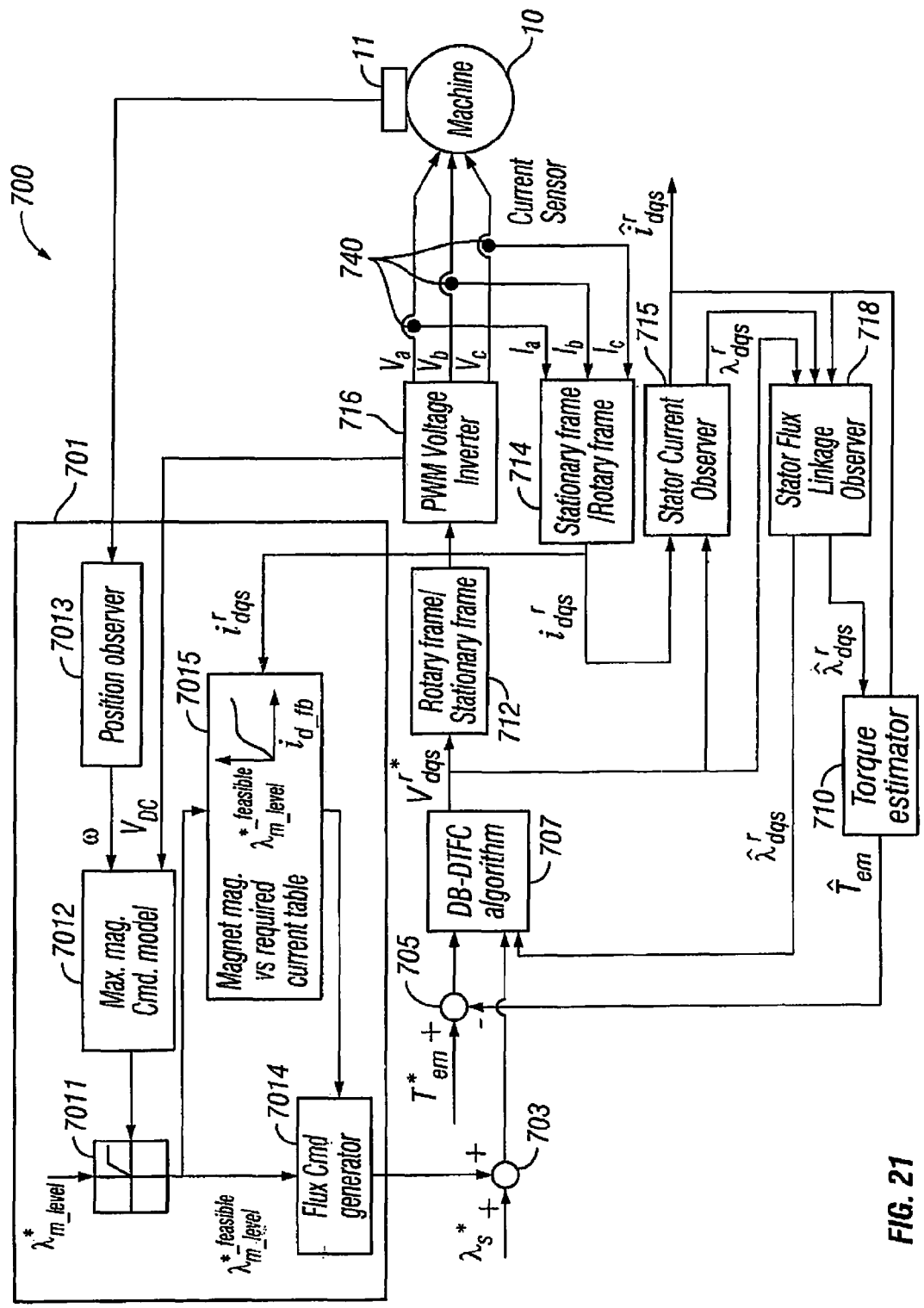
FIG. 21 is an exemplary block diagram of another embodiment of a magnetization current control module with a deadbeat-direct torque flux control algorithm.

Another disclosed embodiment is shown in FIG. 21. The variable magnetization machine controller 700 shown in FIG. 21 is electrically coupled to the variable magnetization machine 10. In this example, the variable magnetization machine controller 700 includes a control module 701, an adder 703, a subtractor 705, a DB-DTFC algorithm module 707, and a torque estimator 710. The variable magnetization machine controller 700 further includes other components similar to those of the variable magnetization machine controller 100 discussed above such as a rotary frame/stationary frame component 712, a stationary frame/rotary frame component 714, a pulse width modulator (PWM) voltage invertor 716, a stator flux linkage observer 718, current detectors 740 and other components as discussed above with regard to FIGS. 2 through 4. These and certain other components (not shown) are configured the same or in a similar manner as corresponding components 112, 114, 116, 118, 140 and the other components of the variable magnetization machine controller 100 discussed above and thus, their descriptions are not repeated here.

The control module 701 includes a component 7011 that receives a signal $\lambda^*_{m\_level}$ and a signal from component 7012. The component 7012 provides the signal to component 7011 based on a voltage signal $V_{DC}$ provided by the PWM voltage inverter 716 and an angle signal $\omega$ representing a detected or estimated angle of the rotor 12 as detected by an angle sensor 11 and provided via position observer component 7013. Thus, the magnetization control pulse output by the control module 701 can be a trapezoidal pulse which prevents a stator reaction $L_D^* di_D/dt$ of the variable magnetization machine 10 from exceeding a value that is permitted for a voltage source, such as the PWM voltage inverter 716, that provides a voltage to the variable magnetization machine 10. This can insure that the control module 701 controls torque without being adversely impacted by any constraints of operation of the variable magnetization machine 10.

Component 7011 provides the output signal $\lambda^{*feasible}_{m\_level}$ to a flux command generator component 7014 and a lookup table 7015. The lookup table 7015 outputs a signal to flux command generator component 7014 based on the signal from the component 7011 and the current signal $i^r_{dqs}$ provided by the stationary frame/rotary frame module 714. The flux command generator 7014 provides a signal to adder 703 based on the signal $\lambda^{*feasible}_{m\_level}$ and the signal output from the lookup table 7015.

The adder 703 adds the signal from the control module 701 to a signal $\lambda_s^*$ and provides an output signal to the DB-DTFC algorithm module 707. The subtractor 705 subtracts a signal $T_{em}$ provided by the torque estimator 710 from the estimated torque signal $T^*_{em}$ and provides a signal to the DB-DTFC algorithm module 707. As shown, the torque estimator 710 provides the signal $T_{em}$ based on the signal $i^r_{dqs}$ provided by the stator current observer 715 and a signal $\lambda^r_{dqs}$ provided by the stator flux linkage observer 718. In other words, the torque estimator 710 can calculate the estimated torque based on a dq-axis vector of an estimated stator flux linkage of the variable magnetization machine 10 and a measured current provided to the variable magnetization machine 10. Therefore, a torque transducer is not necessary. The stator flux linkage observer 718 provides the signal $\lambda^r_{dqs}$ based on signals from the stator current observer 715 and signal $V^r_{dqs}$ output by the DB-DTFC algorithm module 707. As further show, the DB-DTFC algorithm module 707 outputs the signal $V^r_{dqs}$ based on the signals from adder 703 and the subtractor 705 and the signal $\lambda^r_{dqs}$ provided by the stator flux linkage observer 718.

Figure 22:
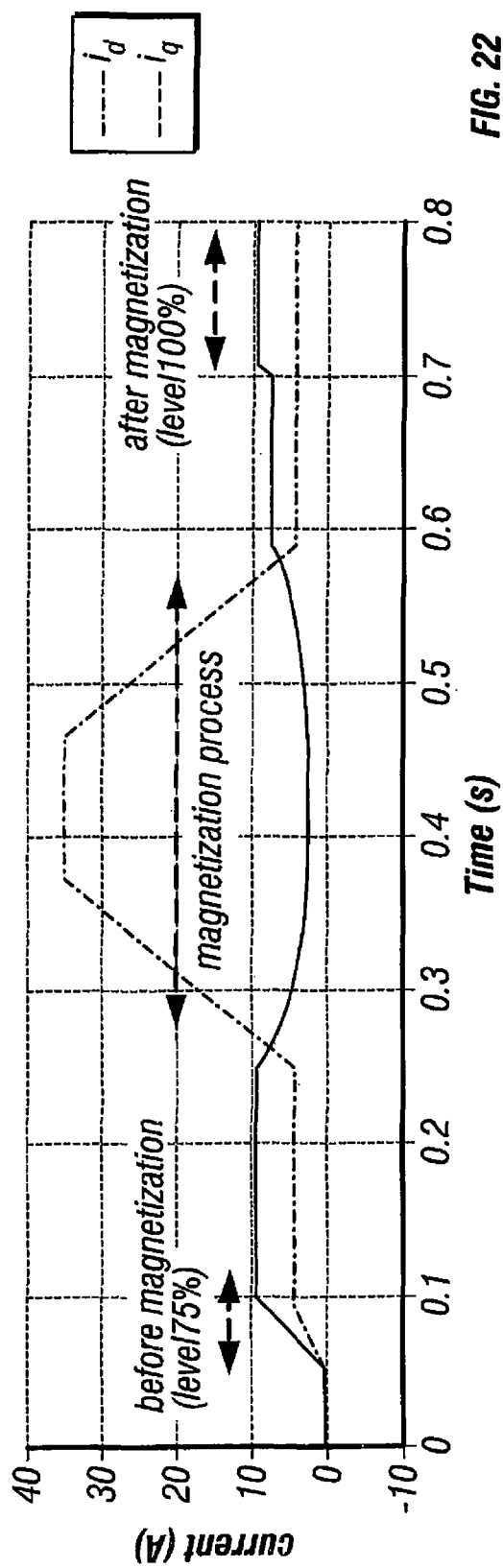
FIG. 22 is a graph illustrating an example of current with respect to time during a magnetization process performed by an embodiment of the variable magnetization machine controller described herein.
Figure 23:
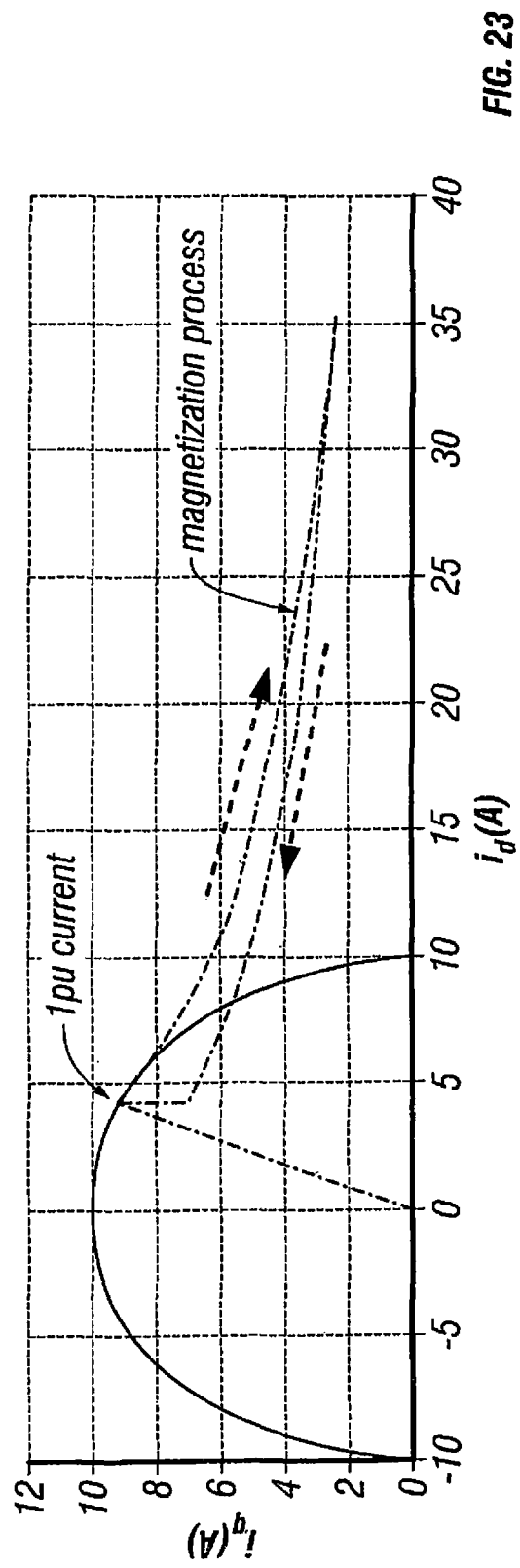
FIG. 23 is a graph illustrating an example of a relationship between q-axis current and q-axis current during a magnetization process performed by an embodiment of the variable magnetization machine controller described herein.
Figure 24:
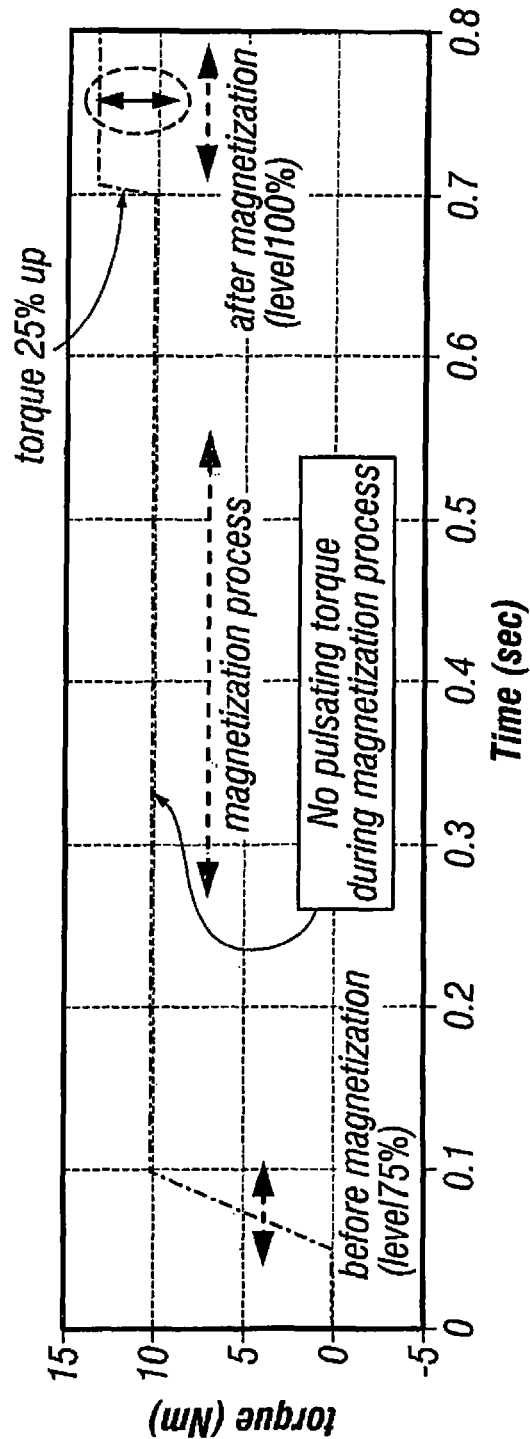
FIG. 24 is a graph illustrating an example of torque of a variable magnetization machine during a magnetization process performed by an embodiment of the variable magnetization machine controller described herein.

The embodiments described herein can apply a current to the variable magnetization machine 10 as shown in FIG. 22 during a magnetization process. An example of a relationship between q-axis current and d-axis current during a magnetization process performed by an embodiment of the variable magnetization machine controller described herein is shown in FIG. 23. Furthermore, the torque of the variable magnetization machine 10 during a magnetization process performed by embodiments of the variable magnetization machine controller described herein can be controlled as shown, for example, in FIG. 24.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:
1. A variable magnetization machine controller comprising:
   a current command module configured to compute a vector current command in a dq axis based on a torque command;
   a magnetization module configured to apply a magnetization control pulse to a d-axis current of the vector current command; and
   a reducing current module configured to apply a reducing current to a q-axis current of the vector current command based on the torque command and one of an estimated torque of the variable magnetization machine and a measured torque of the variable magnetization machine.

2. The variable magnetization machine controller according to claim 1, wherein the reducing current module is further configured to compute the reducing current based on a difference between the torque command and the estimated torque.

3. The variable magnetization machine controller according to claim 1, wherein
the magnetization module is further configured to provide the magnetization control pulse to regulate a gain of a proportional-integral compensator according to a value of the magnetization control pulse.

4. The variable magnetization machine controller according to claim 1, wherein
the reducing current module is configured to reduce a gain for a positive pulse for the variable magnetization machine configured as a positive salient pole machine, and to increase the gain for the positive pulse for the variable magnetization machine configured as a negative salient pole machine.

5. The variable magnetization machine controller according to claim 1, wherein
the magnetization module is further configured to alter the reducing current according to the magnetization control pulse that the magnetization module outputs.

6. The variable magnetization machine controller according to claim 1, further comprising
a torque estimator configured to calculate the estimated torque based on a dq-axis vector of an estimated stator flux linkage of the variable magnetization machine and a measured current provided to the variable magnetization machine.

7. The variable magnetization machine controller according to claim 6, further comprising
a stator flux linkage estimator configured to estimate the stator flux linkage by adding a compensation value that is obtained from a value that is a difference between an output of an observer and a plant with a compensation of a proportional integral controller to produce a sum value that is then added to a state of the observer to produce a Luenburger style observer for machine electrical state variables associated with the variable magnetization machine.

8. The variable magnetization machine controller according to claim 1, wherein
the magnetization module is further configured to vary an amplitude of the magnetization control pulse according to the vector current command output by the current command module.

9. The variable magnetization machine controller according to claim 8, wherein
the magnetization module is further configured to set the amplitude of the magnetization control pulse to a value such that a sum of the magnetization control pulse and a value of current $i_d{}^*$ provide a d-axis current which obtains a prescribed magnetization level for the variable magnetization machine.

10. The variable magnetization machine controller according to claim 1, wherein
the magnetization control pulse is a trapezoidal pulse which prevents a stator reaction $L_d{}^* di_d/dt$ of the variable magnetization machine from exceeding a value that is permitted for a voltage source that provides a voltage to the variable magnetization machine.

11. A method for controlling a variable magnetization machine controller comprising:
computing a vector current command in a dq axis based on a torque command;
applying a magnetization control pulse to a d-axis current of the vector current command; and
applying a reducing current to a q-axis current of the vector current command based on the torque command and one of an estimated torque of the variable magnetization machine and a measured torque of the variable magnetization machine.

12. The method according to claim 11, wherein
the applying of the reducing current includes calculating the reducing current based on a difference between the torque command and the estimated torque.

13. The method according to claim 11, further comprising
altering reducing current according to the magnetization control pulse that the magnetization module outputs.

14. The method according to claim 11, further comprising
calculating the estimated torque based on a dq-axis vector of an estimated stator flux linkage of the variable magnetization machine and a measured current provided to the variable magnetization machine.

15. The method according to claim 11, wherein
the applying of the magnetization control pulse includes varying an amplitude of the magnetization control pulse according to the vector current command.

16. The method according to claim 15, wherein
the applying of the magnetization control pulse includes setting the amplitude of the magnetization control pulse to a value such that a sum of the magnetization control pulse and a value of current $i_d{}^*$ provide a d-axis current which obtains a prescribed magnetization level for the variable magnetization machine.

* * * * *